US010625150B2

(12) United States Patent
Obayashi et al.

(10) Patent No.: US 10,625,150 B2
(45) Date of Patent: Apr. 21, 2020

(54) GAME SYSTEM, GAME APPARATUS, STORAGE MEDIUM HAVING STORED THEREIN GAME PROGRAM, AND GAME PROCESSING METHOD

(71) Applicant: NINTENDO CO., LTD., Kyoto (JP)

(72) Inventors: Shoichi Obayashi, Kyoto (JP); Hiroki Omosako, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 255 days.

(21) Appl. No.: 15/696,536

(22) Filed: Sep. 6, 2017

(65) Prior Publication Data
US 2018/0250584 A1    Sep. 6, 2018

(30) Foreign Application Priority Data
Mar. 1, 2017   (JP) .................. 2017-037871

(51) Int. Cl.
| | | |
|---|---|---|
| A63F 13/211 | (2014.01) | |
| A63F 13/98 | (2014.01) | |
| A63F 13/24 | (2014.01) | |
| A63F 13/428 | (2014.01) | |
| A63F 13/833 | (2014.01) | |
| A63F 13/92 | (2014.01) | |
| A63F 13/25 | (2014.01) | |
| A63F 13/40 | (2014.01) | |

(52) U.S. Cl.
CPC ............ *A63F 13/211* (2014.09); *A63F 13/24* (2014.09); *A63F 13/25* (2014.09); *A63F 13/40* (2014.09); *A63F 13/428* (2014.09); *A63F 13/833* (2014.09); *A63F 13/92* (2014.09); *A63F 13/98* (2014.09)

(58) Field of Classification Search
CPC ........ A63F 13/211; A63F 13/98; A63F 13/24; A63F 13/428; A63F 13/25; A63F 13/833; A63F 13/40; A63F 13/92
See application file for complete search history.

(56) References Cited

U.S. PATENT DOCUMENTS

| | | |
|---|---|---|
| 4,501,424 A | 2/1985 | Stone et al. |
| 5,016,843 A | 5/1991 | Ward |
| 5,421,590 A | 6/1995 | Robbins |
(Continued)

FOREIGN PATENT DOCUMENTS

| | | |
|---|---|---|
| EP | 3 103 532 A3 | 3/2017 |
| GB | 2393316 A | 3/2004 |
(Continued)

OTHER PUBLICATIONS

Office Action dated Apr. 5, 2019 issued in Japanese Application No. 2017-037871 (5 pgs.).
(Continued)

*Primary Examiner* — Kang Hu
*Assistant Examiner* — Thomas H Henry
(74) *Attorney, Agent, or Firm* — Nixon & Vanderhye PC

(57) ABSTRACT

Based on first data corresponding to at least one of a motion and an orientation of a first game controller and second data corresponding to at least one of a motion and an orientation of a second game controller, it is determined whether or not the first game controller and the second game controller are attached to an attachment, and based on the result of the determination, game processing is performed.

22 Claims, 22 Drawing Sheets

(56) References Cited

U.S. PATENT DOCUMENTS

| | | |
|---|---|---|
| 5,667,220 A | 9/1997 | Cheng |
| 5,739,457 A | 4/1998 | Devecka |
| 5,929,809 A | 7/1999 | Erlick et al. |
| 5,929,844 A | 7/1999 | Barnes |
| 6,478,679 B1 | 11/2002 | Himoto et al. |
| 6,540,614 B1 | 4/2003 | Nishino et al. |
| 6,645,067 B1 | 11/2003 | Okita et al. |
| 6,714,189 B2 | 3/2004 | Collins |
| 6,952,197 B1 | 10/2005 | Nakamura et al. |
| 7,379,841 B2 | 5/2008 | Ohta |
| 7,405,353 B2 | 7/2008 | Kiyono et al. |
| 7,479,064 B2 | 1/2009 | Wakitani et al. |
| 7,698,096 B2 | 4/2010 | Ohta |
| 7,711,505 B2 | 5/2010 | Ohta |
| 8,308,563 B2 | 11/2012 | Ikeda et al. |
| 8,439,753 B2 | 5/2013 | Wakitani et al. |
| 8,900,058 B2 | 12/2014 | Wakitani et al. |
| 2001/0012795 A1 | 8/2001 | Asami et al. |
| 2001/0012802 A1 | 8/2001 | Nishiumi |
| 2001/0016518 A1 | 8/2001 | Nishiumi |
| 2003/0114214 A1 | 6/2003 | Barahona et al. |
| 2005/0056997 A1 | 3/2005 | Wakitani et al. |
| 2008/0242412 A1 | 10/2008 | Wakitani et al. |
| 2010/0099494 A1* | 4/2010 | Dohta ............... G06F 3/0325 463/38 |
| 2011/0306424 A1 | 12/2011 | Kazama et al. |
| 2012/0232780 A1 | 9/2012 | Delson et al. |
| 2012/0302347 A1 | 11/2012 | Nicholson |
| 2013/0281212 A1 | 10/2013 | Tsuchiya et al. |
| 2015/0084900 A1 | 3/2015 | Hodges et al. |
| 2015/0153830 A1 | 6/2015 | Hirose |
| 2015/0268722 A1 | 9/2015 | Wang |
| 2016/0361627 A1 | 12/2016 | Fujita et al. |
| 2016/0361633 A1 | 12/2016 | Fujita et al. |
| 2017/0106275 A1 | 4/2017 | Tsuchiya et al. |
| 2017/0372534 A1* | 12/2017 | Steketee ............ G06Q 10/087 |

FOREIGN PATENT DOCUMENTS

| | | |
|---|---|---|
| JP | 04-225413 | 8/1992 |
| JP | 11-232028 | 8/1999 |
| JP | 2000-148136 | 5/2000 |
| JP | 2000-157736 | 6/2000 |
| JP | 2000-172377 | 6/2000 |
| JP | 2000-176176 | 6/2000 |
| JP | 2001-067070 | 3/2001 |
| JP | 2001-069427 | 3/2001 |
| JP | 2001-170352 | 6/2001 |
| JP | 3080103 | 6/2001 |
| JP | 2001-276421 | 10/2001 |
| JP | 2001-321564 | 11/2001 |
| JP | 2001-325055 | 11/2001 |
| JP | 2001-327754 | 11/2001 |
| JP | 2002-011243 | 1/2002 |
| JP | 2002-078970 | 3/2002 |
| JP | 2002-123353 | 4/2002 |
| JP | 2002-202853 | 7/2002 |
| JP | 2002-218558 | 8/2002 |
| JP | 2002-239233 | 8/2002 |
| JP | 2002-248261 | 9/2002 |
| JP | 2002-351489 | 12/2002 |
| JP | 2003-154173 | 5/2003 |
| JP | 2008-307207 | 12/2008 |
| JP | 2008-546534 | 12/2008 |
| JP | 2012-000162 | 1/2012 |
| JP | 2013-236909 | 11/2013 |
| JP | 2017-757 | 1/2017 |
| JP | 2017-000760 | 1/2017 |
| WO | 98/02223 | 1/1998 |
| WO | 99/19036 | 4/1999 |
| WO | 00/31605 | 6/2000 |

OTHER PUBLICATIONS

Extended European Search Report dated Mar. 13, 2018 issued in European Application No. 17189617.8 (13 pgs.).

* cited by examiner

FIG. 9
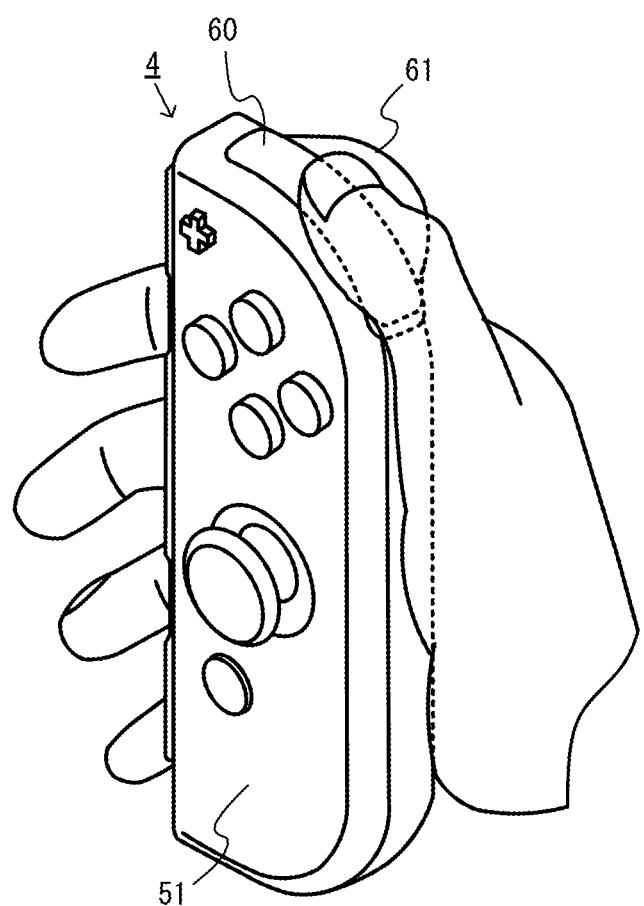
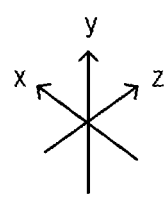

FIG. 11
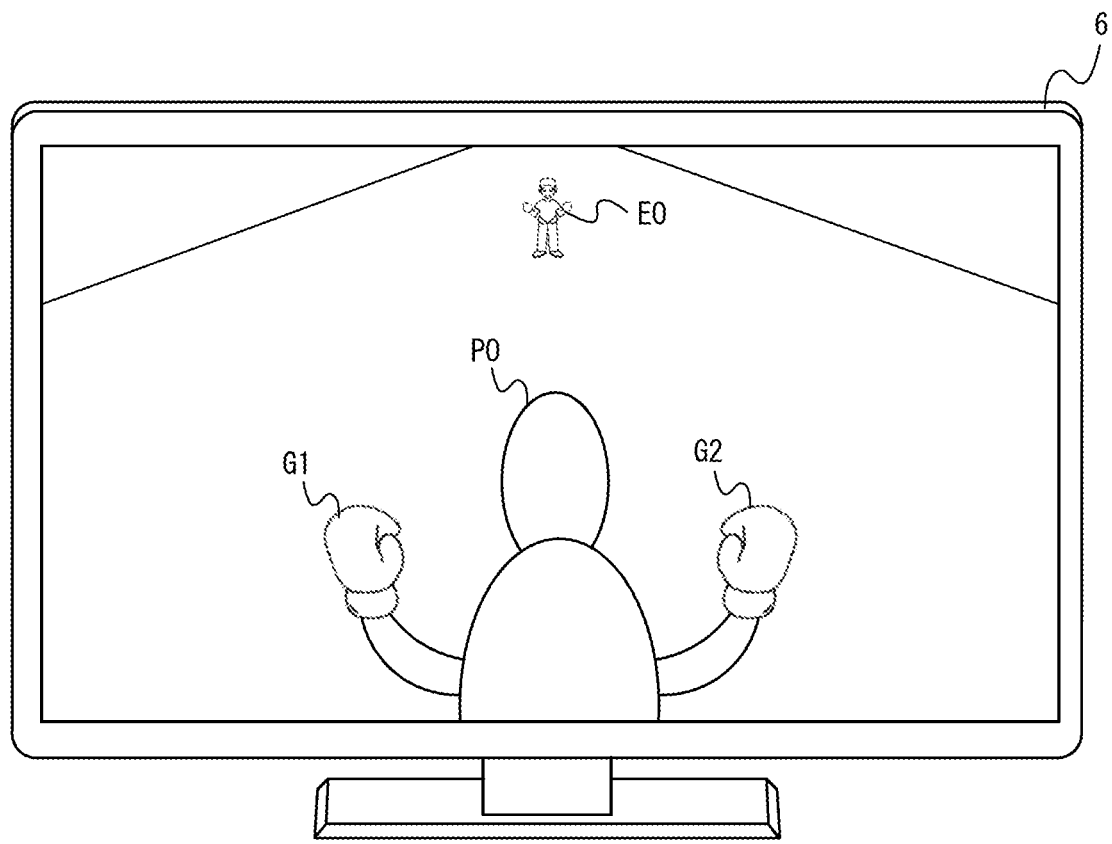
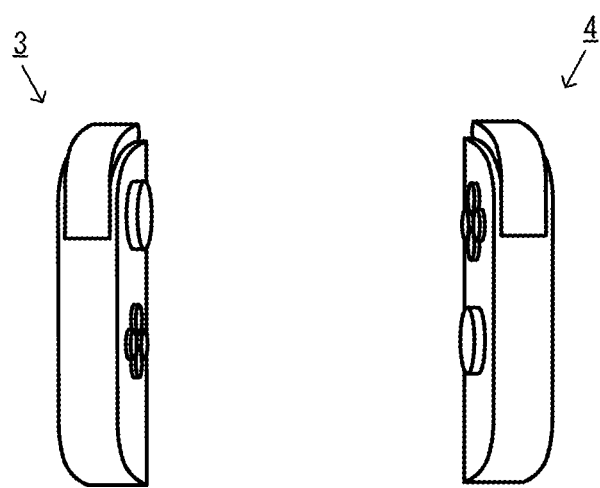

FIG. 12
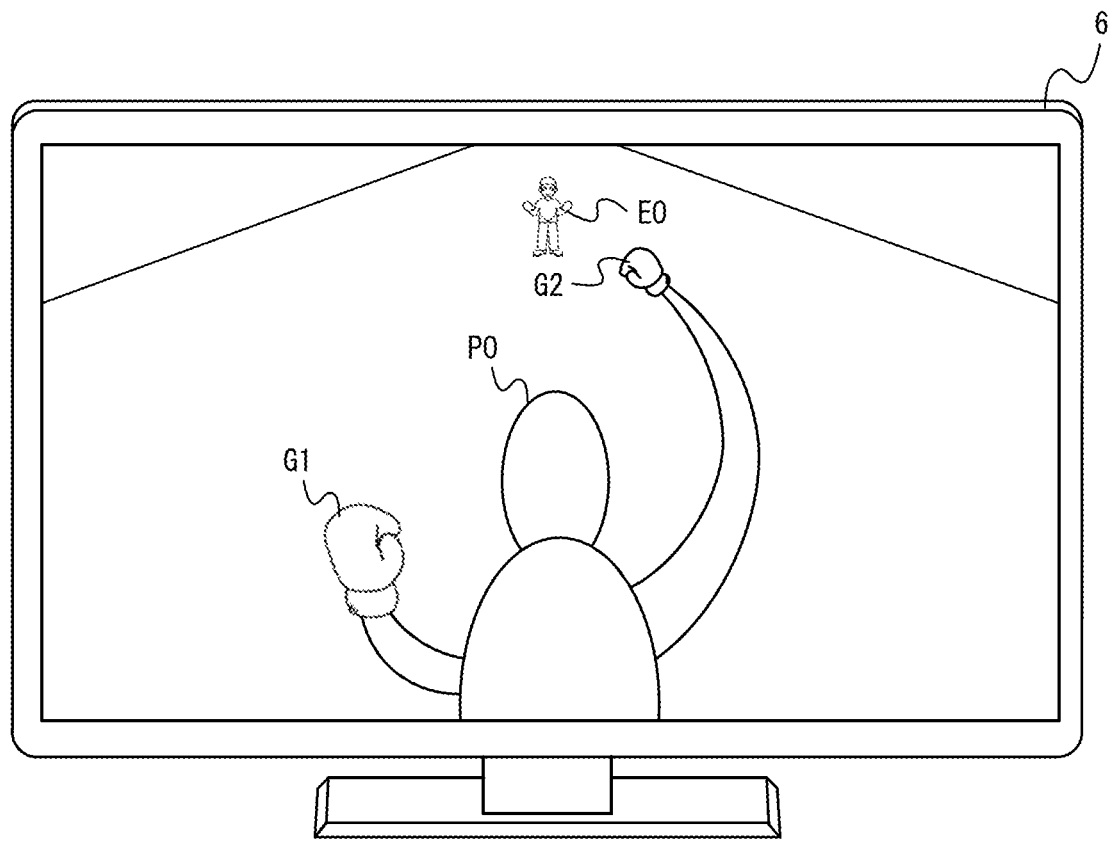
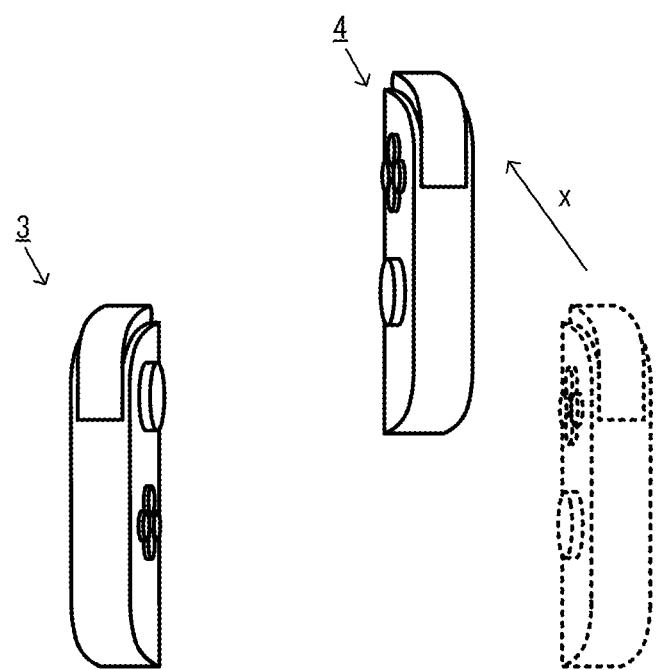

FIG. 13
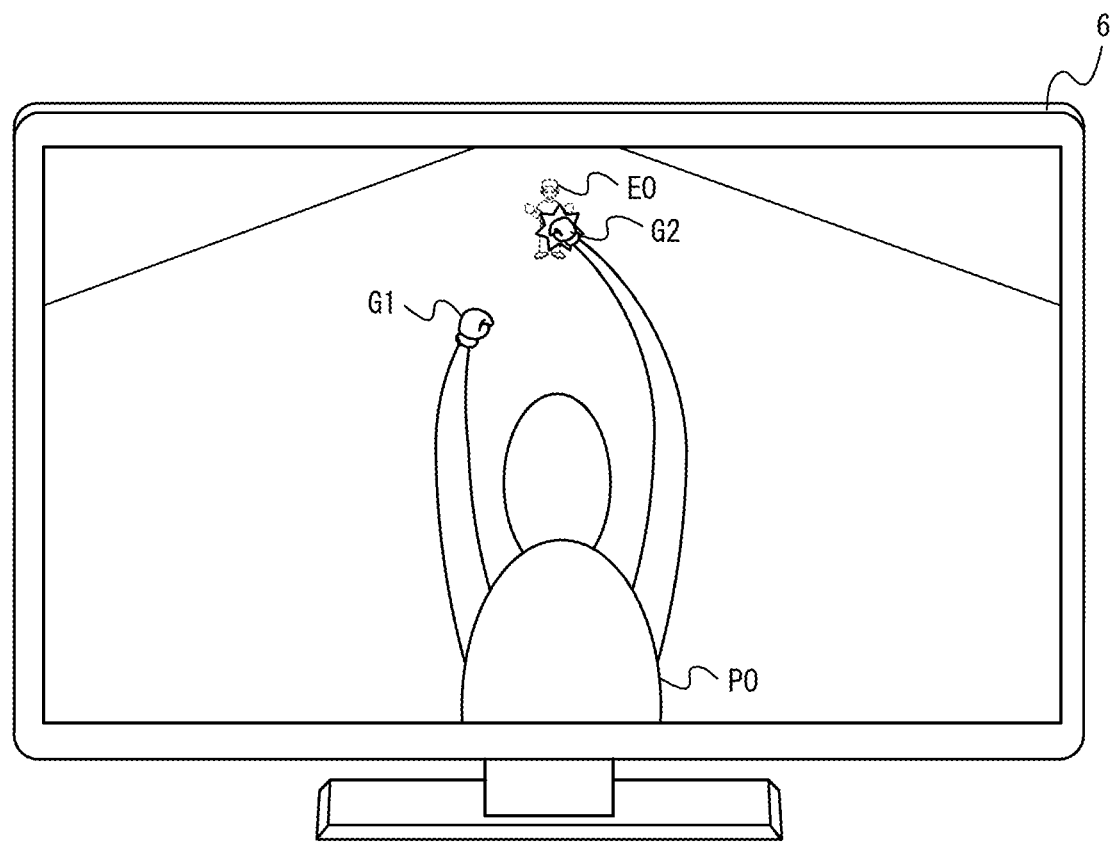
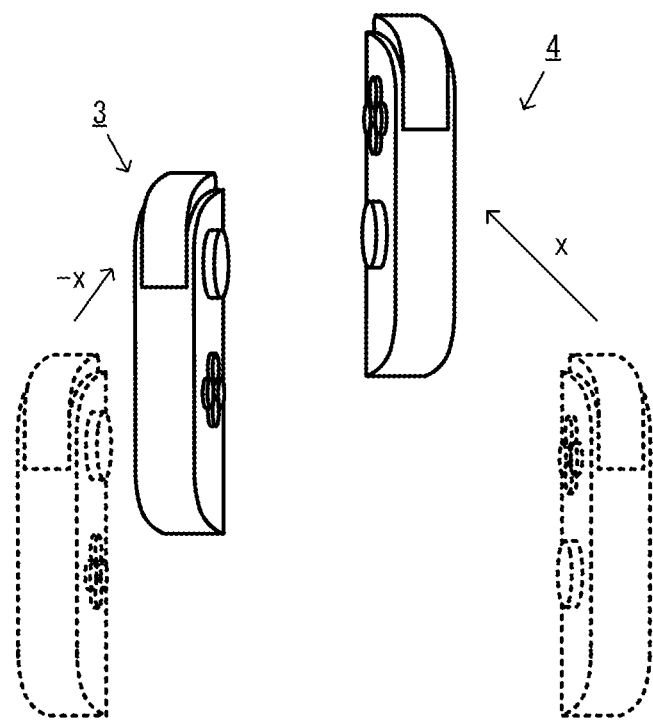

FIG. 17

|  | TWO-HAND-HELD OPERATION METHOD (TWO CONTROLLERS) | EXTENSION GRIP OPERATION METHOD (TWO CONTROLLERS) |
|---|---|---|
| MOVE TO LEFT | TILT TO LEFT (BOTH) | TILT STICK 32 IN POSITIVE x-AXIS DIRECTION |
| MOVE TO RIGHT | TILT TO RIGHT (BOTH) | TILT STICK 32 IN NEGATIVE x-AXIS DIRECTION |
| MOVE FORWARD | TILT FORWARD (BOTH) | TILT STICK 32 IN POSITIVE y-AXIS DIRECTION |
| MOVE BACKWARD | TILT BACKWARD (BOTH) | TILT STICK 32 IN NEGATIVE y-AXIS DIRECTION |
| LEFT PUNCH | SWING (LEFT) | PRESS B-BUTTON 54 |
| RIGHT PUNCH | SWING (RIGHT) | PRESS A-BUTTON 53 |
| JUMP | PRESS FIRST R-BUTTON 60 | PRESS X-BUTTON 55 |
| DASH | PRESS FIRST L-BUTTON 38 | PRESS Y-BUTTON 56 |
| HOOK PUNCH | TILT (LEFT OR RIGHT) | TILT STICK 32 |
| DEFENSE | TILT INWARD (BOTH) | PUSH IN STICK 32 |

GAME SYSTEM, GAME APPARATUS, STORAGE MEDIUM HAVING STORED THEREIN GAME PROGRAM, AND GAME PROCESSING METHOD

CROSS REFERENCE TO RELATED APPLICATION

The disclosure of Japanese Patent Application No. 2017-037871, filed on Mar. 1, 2017, is incorporated herein by reference.

FIELD

The technology shown here relates to a game system, a game apparatus, a storage medium having stored therein a game program, and a game processing method in which an operation can be performed using a game controller.

BACKGROUND AND SUMMARY

Conventionally, there is an attachment that allows game play in the state where a game controller is attached to the attachment.

Regarding the attachment, however, a game apparatus to which a game controller is connected cannot specify whether or not the game controller is attached to the attachment.

Therefore, it is an object of an exemplary embodiment to provide a game system, a game apparatus, a storage medium having stored therein a game program, and a game processing method that are capable of specifying whether a game controller is attached to an attachment.

To achieve the above object, the exemplary embodiment can employ, for example, the following configurations. It should be noted that it is understood that, to interpret the descriptions of the claims, the scope of the claims should be interpreted only by the descriptions of the claims. If there is a conflict between the descriptions of the claims and the descriptions of the specification, the descriptions of the claims take precedence.

In an exemplary configuration of a game system according to the exemplary embodiment, a game system includes a first game controller, a second game controller, an attachment to which the first game controller and the second game controller are attachable, and a game apparatus capable of communicating with the first game controller and the second game controller. The first game controller includes: a first motion/orientation sensor configured to output first data corresponding to at least one of a motion and an orientation of the first game controller; and a first transceiver configured to transmit, to the game apparatus, the first data output from the first motion/orientation sensor. The second game controller includes: a second motion/orientation sensor configured to output second data corresponding to at least one of a motion and an orientation of the second game controller; and a second transceiver configured to transmit, to the game apparatus, the second data output from the second motion/orientation sensor. The game apparatus includes a computer configured to: receive the first data and the second data; based on the first data and the second data, determine whether or not the first game controller and the second game controller are attached to the attachment; and based on at least the result of the determination in the determination, perform game processing.

Based on the above, based on at least one of the motion and the orientation of a first game controller and at least one of the motion and the orientation of a second game controller, it is possible to determine whether the game controllers are operated in the state where the game controllers are attached to an attachment, or the game controllers are operated in the state where the game controllers are not attached to the attachment.

Further, the first motion/orientation sensor may be an angular velocity sensor configured to detect an angular velocity generated in the first game controller. The second motion/orientation sensor may be an angular velocity sensor configured to detect an angular velocity generated in the second game controller.

Based on the above, based on an angular velocity generated in the first game controller and an angular velocity generated in the second game controller, it is possible to determine whether the game controllers are operated in the state where the game controllers are attached to the attachment, or the game controllers are operated in the state where the game controllers are not attached to the attachment.

Further, in the determination, the computer may be further configured to: based on an angular velocity corresponding to the first data, calculate a first orientation of the first game controller; and based on an angular velocity corresponding to the second data, calculate a second orientation of the second game controller. In this case, in the determination, based on the first orientation and the second orientation, it may be determined whether or not the first game controller and the second game controller are attached to the attachment.

Based on the above, based on an orientation based on the angular velocity generated in the first game controller and an orientation based on the angular velocity generated in the second game controller, it is possible to determine whether the game controllers are operated in the state where the game controllers are attached to the attachment, or the game controllers are operated in the state where the game controllers are not attached to the attachment.

Further, in the determination, when a difference between the first orientation and the second orientation is within a predetermined range, it may be determined that the first game controller and the second game controller are attached to the attachment.

Based on the above, based on whether or not the difference between the orientation of the first game controller and the orientation of the second game controller is within a predetermined range, it is possible to determine that the game controllers are operated in the state where the game controllers are attached to the attachment.

Further, in the determination, when a state where the difference between the first orientation and the second orientation is within the predetermined range continues for a predetermined time, it may be determined that the first game controller and the second game controller are attached to the attachment.

Based on the above, a determination is made based on whether the state where a condition is satisfied continues for a predetermined time, and therefore, it is possible to prevent an erroneous determination.

Further, in the determination, the computer may be further configured to: in accordance with an angular velocity based on the first data, calculate a first parameter indicating at least one of the motion and the orientation of the first game controller and different from the first orientation; and in accordance with an angular velocity based on the second data, calculate a second parameter indicating at least one of the motion and the orientation of the second game controller and different from the second orientation. In this case, in the determination, based on the first orientation, the second orientation, the first parameter, and the second parameter, it may be determined whether or not the first game controller and the second game controller are attached to the attachment.

Based on the above, based on an orientation based on the angular velocity generated in the first game controller and a parameter different from the orientation, and based on an orientation based on the angular velocity generated in the second game controller and a parameter different from the orientation, it is possible to determine whether the game controllers are operated in the state where the game controllers are attached to the attachment, or the game controllers are operated in the state where the game controllers are not attached to the attachment.

Based on the above, when the same angular velocity is generated in the first game controller and the second game controller, it is possible to determine that the game controller are operated in the state where the game controllers are attached to the attachment.

Further, the first game controller may further include a third motion/orientation sensor configured to output third data corresponding to at least one of the motion and the orientation of the first game controller, the third motion/orientation sensor being different from the first motion/orientation sensor. The first transceiver may further transmit, to the game apparatus, the third data output from the third motion/orientation sensor. The second game controller may further include a fourth motion/orientation sensor configured to output fourth data corresponding to at least one of the motion and the orientation of the second game controller, the fourth motion/orientation sensor being different from the second motion/orientation sensor. The second transceiver may further transmit, to the game apparatus, the fourth data output from the fourth motion/orientation sensor. In the reception, the third data and the fourth data may be further received. In the determination, based on the third data and the fourth data in addition to the first data and the second data, it may be determined whether or not the first game controller and the second game controller are attached to the attachment. It should be noted that the third data transmitted from the first transceiver may be data itself output from the third motion/orientation sensor, or data obtained by processing data output by the third motion/orientation sensor for transmission and reception and the like. Further, the fourth data transmitted from the second transceiver may be data output itself from the fourth motion/orientation sensor, or may be data obtained by processing data output from the fourth motion/orientation sensor for transmission and reception and the like.

Based on the above, further using a detection result of another sensor for outputting data corresponding to at least one of the motion and the orientation of the first controller and a detection result of another sensor for outputting data corresponding to at least one of the motion and the orientation of the second game controller, it is possible to determine whether the game controllers are operated in the state where the game controllers are attached to the attachment, or the game controllers are operated in the state where the game controllers are not attached to the attachment.

Further, the first motion/orientation sensor may be an angular velocity sensor configured to detect an angular velocity generated in the first game controller. The second motion/orientation sensor may be an angular velocity sensor configured to detect an angular velocity generated in the second game controller. The third motion/orientation sensor may be an acceleration sensor configured to detect an acceleration generated in the first game controller. The fourth motion/orientation sensor may be an acceleration sensor configured to detect an acceleration generated in the second game controller.

Based on the above, using angular velocities and accelerations generated in the first game controller and the second game controller, it is possible to determine whether the game controllers are operated in the state where the game controllers are attached to the attachment, or the game controllers are operated in the state where the game controllers are not attached to the attachment.

Further, in the determination, when at least either of the at least one of the motion and the orientation of the first game controller indicated by the third data and the at least one of the motion and the orientation of the second game controller indicated by the fourth data satisfies a predetermined condition, a result of a determination before the condition is satisfied may be maintained.

Based on the above, when at least one of an acceleration generated in the first game controller and an acceleration generated in the second game controller satisfies a predetermined condition, a determination is not made, whereby it is possible to prevent an erroneous determination.

Further, in the determination, when a difference between a value of the first data and a value of the second data is within a predetermined range, it may be determined that the first game controller and the second game controller are attached to the attachment.

Based on the above, based on data corresponding to at least one of the motion and the orientation of the first game controller and data corresponding to at least one of the motion and the orientation of the second game controller, it is possible to determine whether the game controllers are operated in the state where the game controllers are attached to the attachment, or the game controllers are operated in the state where the game controllers are not attached to the attachment.

Further, in the determination, when a state where the difference between the value of the first data and the value of the second data is within the predetermined range continues for a predetermined time, it may be determined that the first game controller and the second game controller are attached to the attachment.

Based on the above, a determination is made based on whether the state where a condition is satisfied continues for a predetermined time. Thus, it is possible to prevent an erroneous determination.

Further, in the determination, at least in a period in which the game processing is performed in the performance of the game processing, a determination process for determining whether or not the first game controller and the second game controller are attached to the attachment may be repeatedly performed.

Based on the above, even when an operation method is changed during game processing, game processing based on the operation method after this change can be performed.

Further, in the performance of the game processing, when it is determined in the determination that the first game controller and the second game controller are not attached to the attachment, the game processing may be performed based on a first operation mode, and when it is determined in the determination that the first game controller and the second game controller are attached to the attachment, the game processing may be performed based on a second operation mode. In the determination, when a condition for determining that the motion or the orientation of at least one of the first game controller and the second game controller is the motion or the orientation of the controller used in the first operation mode is satisfied in a state where the game processing is performed in the first operation mode, the result of the determination that the first game controller and the second game controller are not attached to the attachment may be maintained.

Based on the above, when the motion or the orientation of at least one of the first game controller and the second game controller is used in game processing, a determination is not made, whereby it is possible to prevent an erroneous determination.

Further, in the performance of the game processing, when it is determined in the determination that the first game controller and the second game controller are not attached to the attachment, the game processing may be performed based on a first operation mode, and when it is determined in the determination that the first game controller and the second game controller are attached to the attachment, the game processing may be performed based on a second operation mode.

Based on the above, different game processing can be performed based on whether the game controllers are operated in the state where the game controllers are attached to an attachment, or the game controllers are operated in the state where the game controllers are not attached to the attachment.

Further, in the performance of the game processing, when the first operation mode is set, game processing may be performed in accordance with a first operation performed on the first game controller and/or the second game controller, and when the second operation mode is set, the game processing may be performed in accordance with a second operation different from the first operation performed on the first game controller and/or the second game controller.

Based on the above, even if different operations are performed when an operation is performed in a first operation mode and when an operation is performed in a second operation mode, the same game processing can be performed. Thus, it is possible to set operation methods rich in variation.

Further, in the performance of the game processing, when the first operation mode is set, game processing may be performed in accordance with a third operation performed on the first game controller and/or the second game controller, and when the second operation mode is set, game processing different from the game processing may be performed in accordance with the third operation performed on the first game controller and/or the second game controller.

Based on the above, even if the same operation is performed when an operation is performed in a first operation mode and when an operation is performed in a second operation mode, different game processing can be performed. Thus, it is possible to set operation methods rich in variation.

Further, the first transceiver may transmit first operation data corresponding to an operation performed on the first game controller, together with the first data to the game apparatus. The second transceiver may transmit second operation data corresponding to an operation performed on the second game controller, together with the second data to the game apparatus. In this case, in the reception, the first data, the second data, the first operation data, and the second operation data may be received. In the performance of the game processing, based on the result of the determination in the determination, and the first operation data and the second operation data, the game processing may be performed.

Based on the above, it is possible to determine whether the game controllers are operated in the state where the game controllers are attached to the attachment, or the game controllers are operated in the state where the game controllers are not attached to the attachment, and also based on the result of the determination, game processing corresponding to operations on the game controllers can be performed.

Further, in the determination, the computer may be further configured to: based on the first data, calculate the motion of the first game controller; and based on the second data, calculate the motion of the second game controller. In this case, in the determination, when the motion of the first game controller and the motion of the second game controller are the same as each other, it may be determined that the first game controller and the second game controller are attached to the attachment.

Based on the above, when the first game controller and the second game controller make the same motion, it is possible to determine that the game controllers are operated in the state where the game controllers are attached to the attachment.

Further, the first motion/orientation sensor may be an angular velocity sensor configured to detect an angular velocity generated in the first game controller. The second motion/orientation sensor may be an angular velocity sensor configured to detect an angular velocity generated in the second game controller. In the calculation of the motion of the first game controller, the angular velocity generated in the first game controller may be calculated as the motion of the first game controller. In the calculation of the motion of the second game controller, the angular velocity generated in the second game controller may be calculated as the motion of the second game controller.

Further, the exemplary embodiment may be carried out in the forms of a game apparatus, a storage medium having stored therein a game program, and a game processing method.

According to the exemplary embodiment, it is possible to determine whether a game controller is operated in the state where the game controller is attached to an attachment, or the game controller is operated in the state where the game controller is not attached to the attachment.

These and other objects, features, aspects and advantages of the exemplary embodiments will become more apparent from the following detailed description of the exemplary embodiments when taken in conjunction with the accompanying drawings.

BRIEF DESCRIPTION OF THE DRAWINGS

FIG. 9 is a diagram showing a non-limiting example of the state where the single user uses the game system 1 by holding the set of the left controller 3 and the right controller 4 in the separate state;

FIG. 11 is a diagram showing a non-limiting example of a game image displayed in a game played by moving the left controller 3 and the right controller 4;

FIG. 12 is a diagram showing a non-limiting example of the game image displayed in the game played by moving the left controller 3 and the right controller 4;

FIG. 13 is a diagram showing a non-limiting example of the game image displayed in the game played by moving the left controller 3 and the right controller 4;

FIG. 17 is a non-limiting example of an operation correspondence table indicating the actions of a player object PO for operation contents for each of operation methods;

DETAILED DESCRIPTION OF NON-LIMITING EXAMPLE EMBODIMENTS

A game system according to an example of an exemplary embodiment is described below. An example of a game system 1 according to the exemplary embodiment includes a main body apparatus (an information processing apparatus; which functions as a game apparatus main body in the exemplary embodiment) 2, a left controller 3, and a right controller 4. Each of the left controller 3 and the right controller 4 is attachable to and detachable from the main body apparatus 2. That is, the game system 1 can be used as a unified apparatus obtained by attaching each of the left controller 3 and the right controller 4 to the main body apparatus 2. Further, in the game system 1, the main body apparatus 2, the left controller 3, and the right controller 4 can also be used as separate bodies (see FIG. 2). Hereinafter, first, the hardware configuration of the game system 1 according to the exemplary embodiment is described, and then, the control of the game system 1 according to the exemplary embodiment is described.

Figure 1:
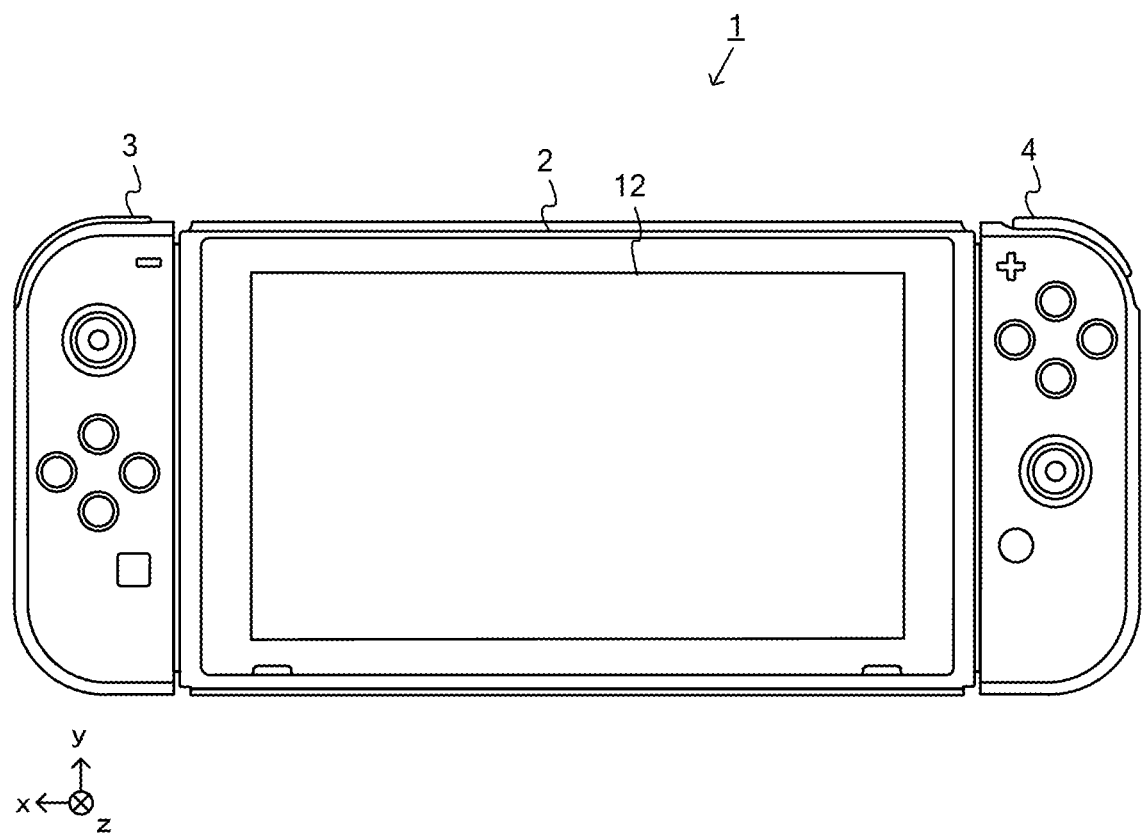
FIG. 1 is a diagram showing a non-limiting example of the state where a left controller 3 and a right controller 4 are attached to a main body apparatus 2 in an example of a game system 1 according to an exemplary embodiment.

FIG. 1 is a diagram showing an example of the state where the left controller 3 and the right controller 4 are attached to the main body apparatus 2. As shown in FIG. 1, each of the left controller 3 and the right controller 4 is attached to and unified with the main body apparatus 2. The main body apparatus 2 is an apparatus for performing various processes (e.g., game processing) in the game system 1. The main body apparatus 2 includes a display 12. Each of the left controller 3 and the right controller 4 is an apparatus including operation sections with which a user provides inputs.

Figure 2:
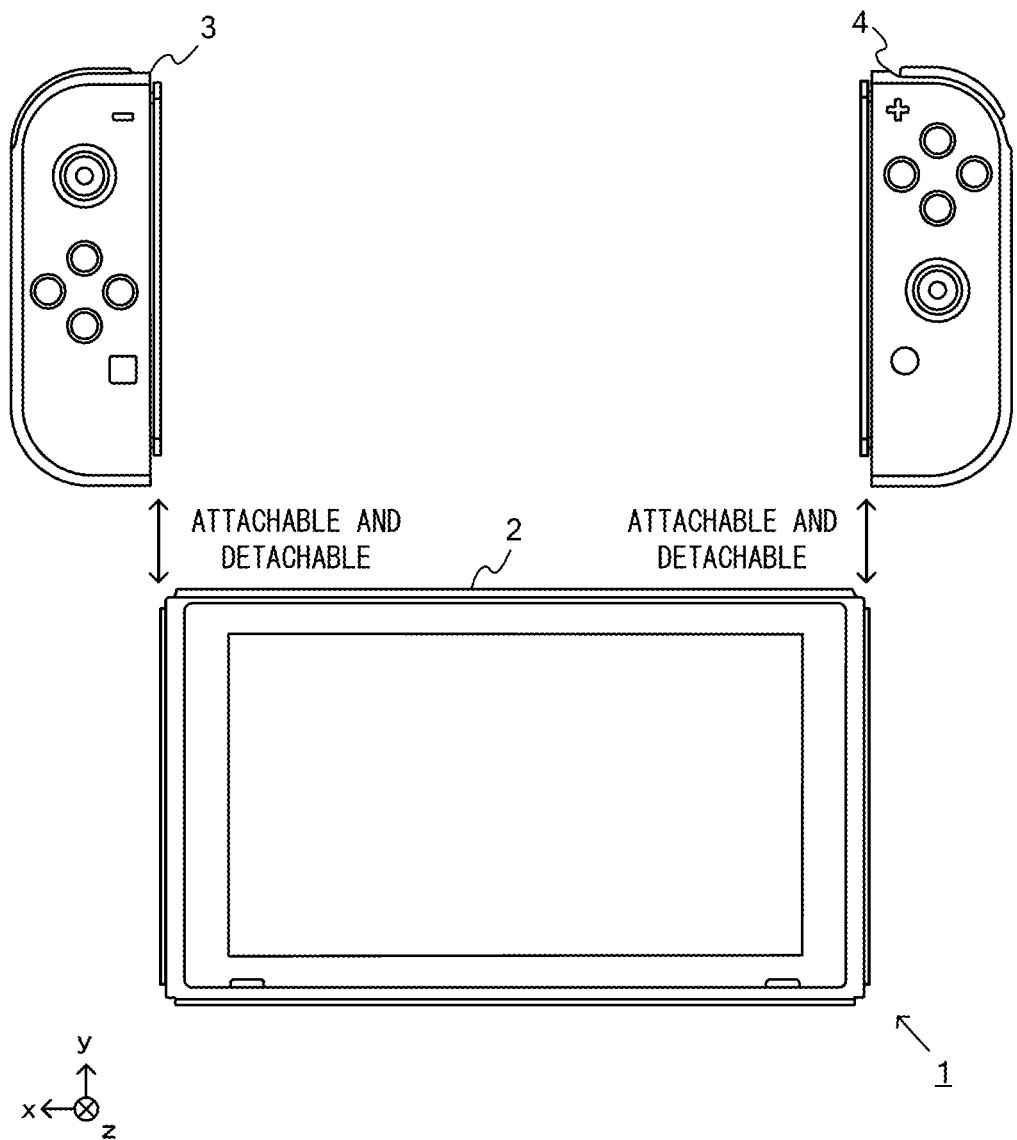
FIG. 2 is a diagram showing a non-limiting example of the state where each of the left controller 3 and the right controller 4 is detached from the main body apparatus 2.

FIG. 2 is a diagram showing an example of the state where each of the left controller 3 and the right controller 4 is detached from the main body apparatus 2. As shown in FIGS. 1 and 2, the left controller 3 and the right controller 4 are attachable to and detachable from the main body apparatus 2. It should be noted that hereinafter, the left controller 3 and the right controller 4 will occasionally be referred to collectively as a "controller".

Figure 3:
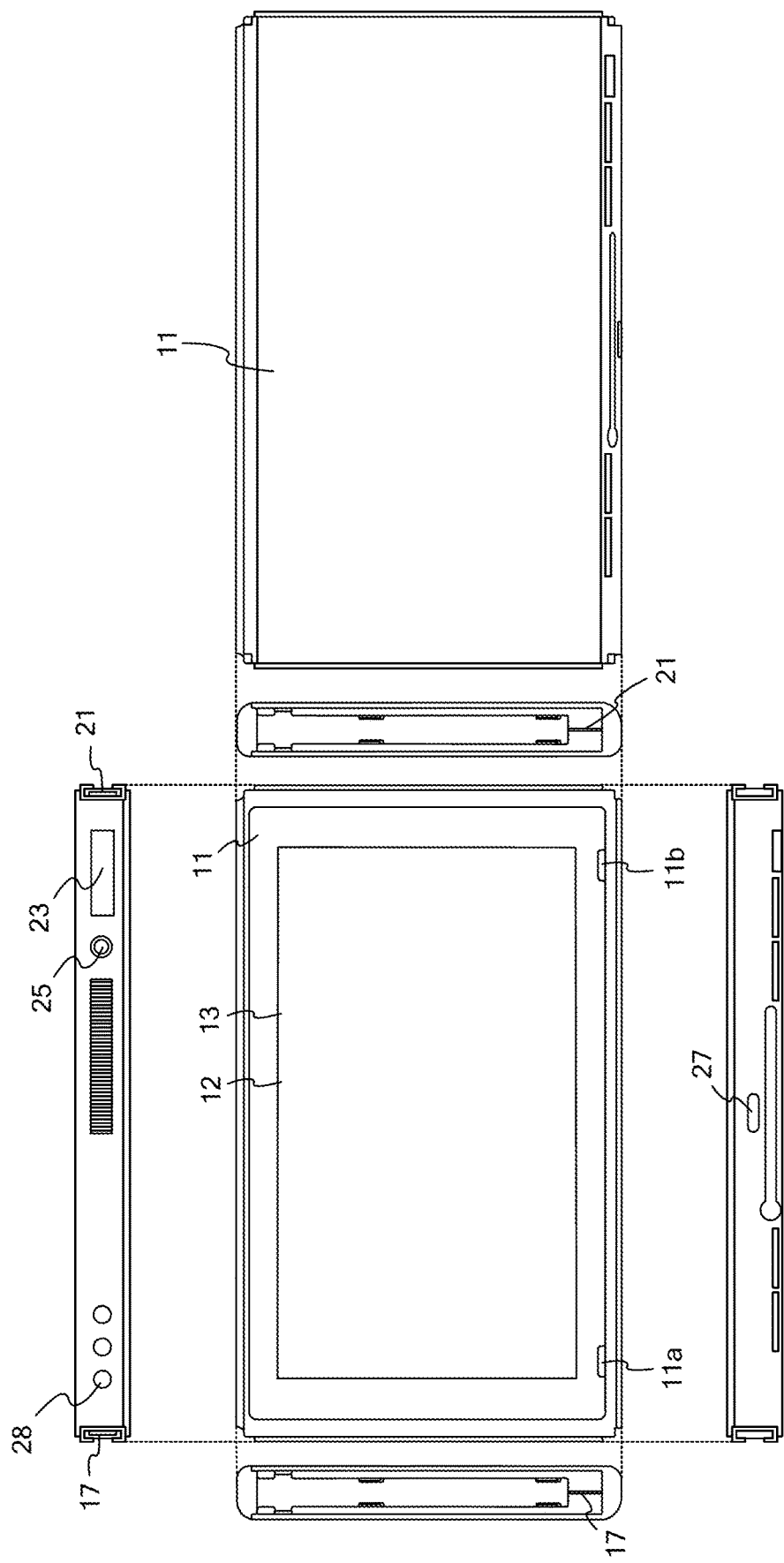
FIG. 3 is six orthogonal views showing a non-limiting example of the main body apparatus 2.

FIG. 3 is six orthogonal views showing an example of the main body apparatus 2. As shown in FIG. 3, the main body apparatus 2 includes an approximately plate-shaped housing 11. In the exemplary embodiment, a main surface (in other words, a surface on a front side, i.e., a surface on which the display 12 is provided) of the housing 11 has a generally rectangular shape.

It should be noted that the shape and the size of the housing 11 are optional. As an example, the housing 11 may be of a portable size. Further, the main body apparatus 2 alone or the unified apparatus obtained by attaching the left controller 3 and the right controller 4 to the main body apparatus 2 may function as a mobile apparatus. The main body apparatus 2 or the unified apparatus may function as a handheld apparatus or a portable apparatus.

As shown in FIG. 3, the main body apparatus 2 includes the display 12, which is provided on the main surface of the housing 11. The display 12 displays an image generated by the main body apparatus 2. In the exemplary embodiment, the display 12 is a liquid crystal display device (LCD). The display 12, however, may be a display device of any type.

Further, the main body apparatus 2 includes a touch panel 13 on a screen of the display 12. In the exemplary embodiment, the touch panel 13 is of a type that allows a multi-touch input (e.g., a capacitive type). The touch panel 13, however, may be of any type. For example, the touch panel 13 may be of a type that allows a single-touch input (e.g., a resistive type).

The main body apparatus 2 includes speakers (i.e., speakers 88 shown in FIG. 6) within the housing 11. As shown in FIG. 3, speaker holes 11a and 11b are formed on the main surface of the housing 11. Then, sounds output from the speakers 88 are output through the speaker holes 11a and 11b.

Further, the main body apparatus 2 includes a left terminal 17, which is a terminal for the main body apparatus 2 to perform wired communication with the left controller 3, and a right terminal 21, which is a terminal for the main body apparatus 2 to perform wired communication with the right controller 4.

As shown in FIG. 3, the main body apparatus 2 includes a slot 23. The slot 23 is provided on an upper side surface of the housing 11. The slot 23 is so shaped as to allow a predetermined type of storage medium to be attached to the slot 23. The predetermined type of storage medium is, for example, a dedicated storage medium (e.g., a dedicated memory card) for the game system 1 and an information processing apparatus of the same type as the game system 1. The predetermined type of storage medium is used to store, for example, data (e.g., saved data of an application or the like) used by the main body apparatus 2 and/or a program (e.g., a program for an application or the like) executed by the main body apparatus 2. Further, the main body apparatus 2 includes a power button 28.

The main body apparatus 2 includes a lower terminal 27. The lower terminal 27 is a terminal for the main body apparatus 2 to communicate with a cradle. In the exemplary embodiment, the lower terminal 27 is a USB connector (more specifically, a female connector). Further, when the unified apparatus or the main body apparatus 2 alone is mounted on the cradle, the game system 1 can display on a stationary monitor an image generated by and output from the main body apparatus 2. Further, in the exemplary embodiment, the cradle has the function of charging the unified apparatus or the main body apparatus 2 alone mounted on the cradle. Further, the cradle has the function of a hub device (specifically, a USB hub).

Figure 4:
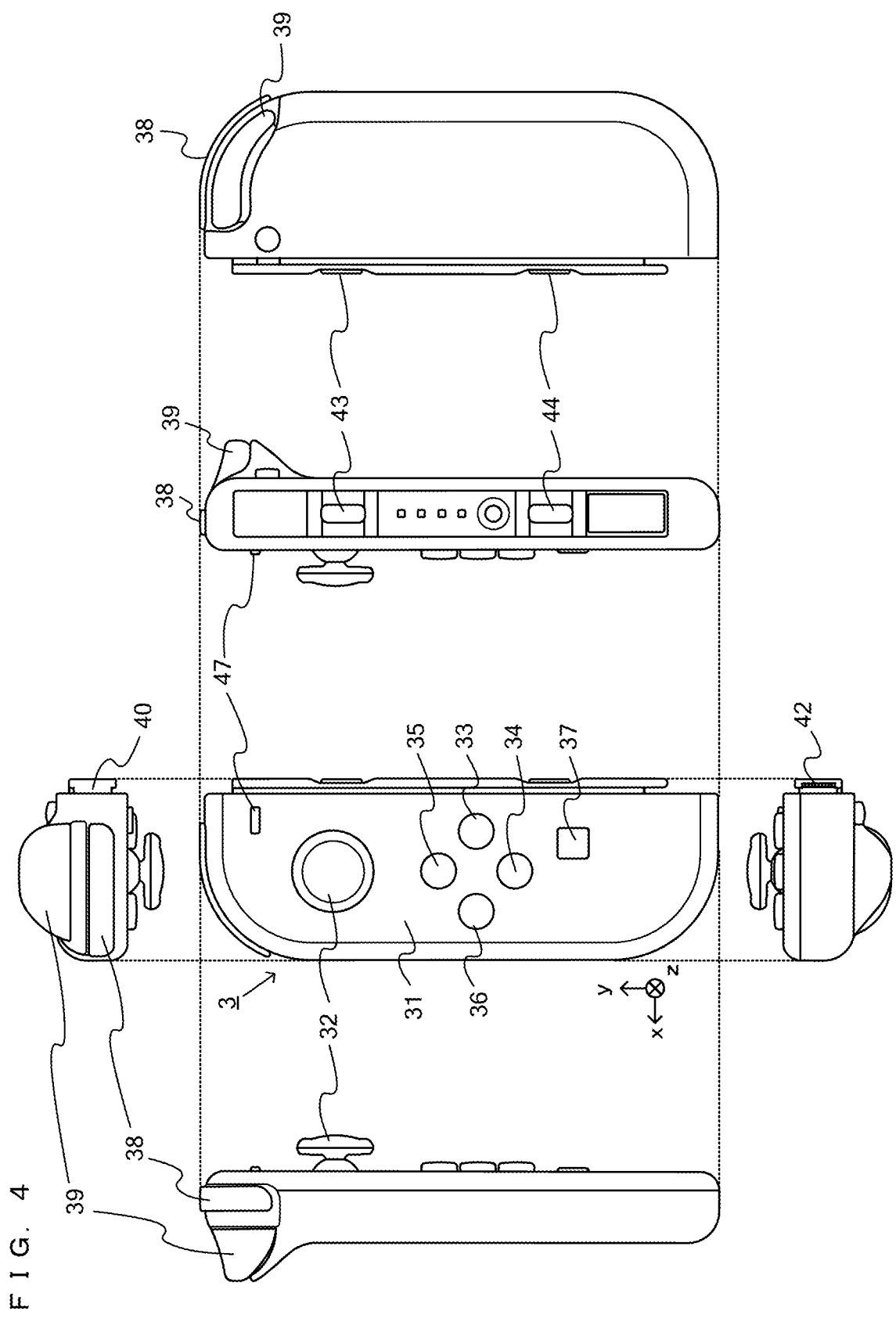
FIG. 4 is six orthogonal views showing a non-limiting example of the left controller 3.

FIG. 4 is six orthogonal views showing an example of the left controller 3. As shown in FIG. 4, the left controller 3 includes a housing 31. In the exemplary embodiment, the housing 31 has a vertically long shape, i.e., is shaped to be long in an up-down direction (i.e., a y-axis direction shown in FIGS. 1 and 4). In the state where the left controller 3 is detached from the main body apparatus 2, the left controller 3 can also be held in the orientation in which the left controller 3 is vertically long. The housing 31 has such a shape and a size that when held in the orientation in which the housing 31 is vertically long, the housing 31 can be held with one hand, particularly the left hand. Further, the left controller 3 can also be held in the orientation in which the left controller 3 is horizontally long. When held in the orientation in which the left controller 3 is horizontally long, the left controller 3 may be held with both hands.

The left controller 3 includes an analog stick 32. As shown in FIG. 4, the analog stick 32 is provided on a main surface of the housing 31. The analog stick 32 can be used as a direction input section with which a direction can be input. The user tilts the analog stick 32 and thereby can input a direction corresponding to the direction of the tilt (and input a magnitude corresponding to the angle of the tilt). It should be noted that the left controller 3 may include a directional pad, a slide stick that allows a slide input, or the like as the direction input section, instead of the analog stick. Further, in the exemplary embodiment, it is possible to provide an input by pressing the analog stick 32.

The left controller 3 includes various operation buttons. The left controller 3 includes four operation buttons 33 to 36 (specifically, a right direction button 33, a down direction button 34, an up direction button 35, and a left direction button 36) on the main surface of the housing 31. Further, the left controller 3 includes a record button 37 and a "−" (minus) button 47. The left controller 3 includes a first L-button 38 and a ZL-button 39 in an upper left portion of a side surface of the housing 31. Further, the left controller 3 includes a second L-button 43 and a second R-button 44, on the side surface of the housing 31 on which the left controller 3 is attached to the main body apparatus 2. These operation buttons are used to give instructions depending on various programs (e.g., an OS program and an application program) executed by the main body apparatus 2.

Further, the left controller 3 includes a terminal 42 for the left controller 3 to perform wired communication with the main body apparatus 2.

Figure 5:
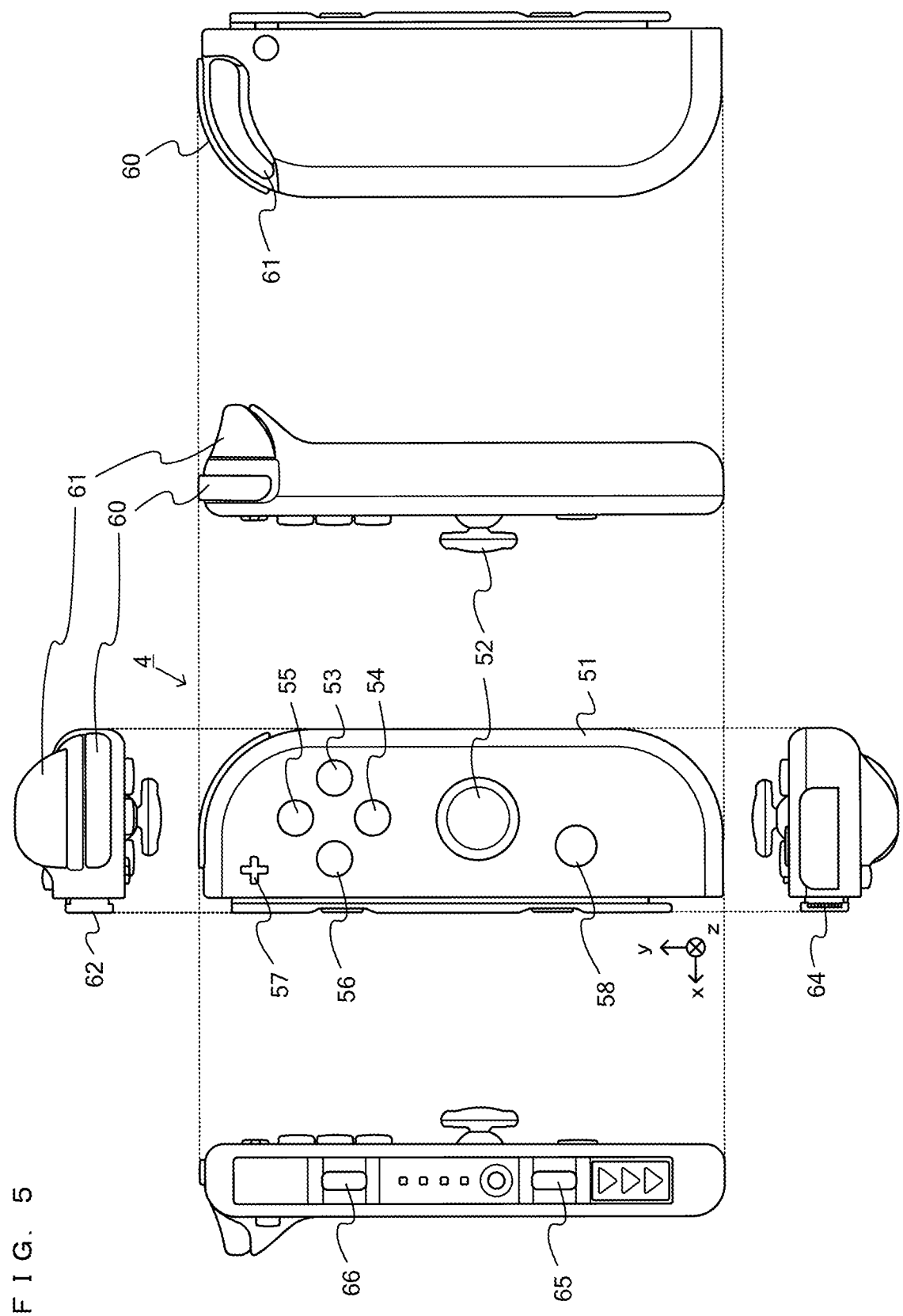
FIG. 5 is six orthogonal views showing a non-limiting example of the right controller 4.

FIG. 5 is six orthogonal views showing an example of the right controller 4. As shown in FIG. 5, the right controller 4 includes a housing 51. In the exemplary embodiment, the housing 51 has a vertically long shape, i.e., is shaped to be long in the up-down direction. In the state where the right controller 4 is detached from the main body apparatus 2, the right controller 4 can also be held in the orientation in which the right controller 4 is vertically long. The housing 51 has such a shape and a size that when held in the orientation in which the housing 51 is vertically long, the housing 51 can be held with one hand, particularly the right hand. Further, the right controller 4 can also be held in the orientation in which the right controller 4 is horizontally long. When held in the orientation in which the right controller 4 is horizontally long, the right controller 4 may be held with both hands.

Similarly to the left controller 3, the right controller 4 includes an analog stick 52 as a direction input section. In the exemplary embodiment, the analog stick 52 has the same configuration as that of the analog stick 32 of the left controller 3. Further, the right controller 4 may include a directional pad, a slide stick that allows a slide input, or the like, instead of the analog stick. Further, similarly to the left controller 3, the right controller 4 includes four operation buttons 53 to 56 (specifically, an A-button 53, a B-button 54, an X-button 55, and a Y-button 56) on a main surface of the housing 51. Further, the right controller 4 includes a "+" (plus) button 57 and a home button 58. Further, the right controller 4 includes a first R-button 60 and a ZR-button 61 in an upper right portion of a side surface of the housing 51. Further, similarly to the left controller 3, the right controller 4 includes a second L-button 65 and a second R-button 66.

Further, the right controller 4 includes a terminal 64 for the right controller 4 to perform wired communication with the main body apparatus 2.

Figure 6:
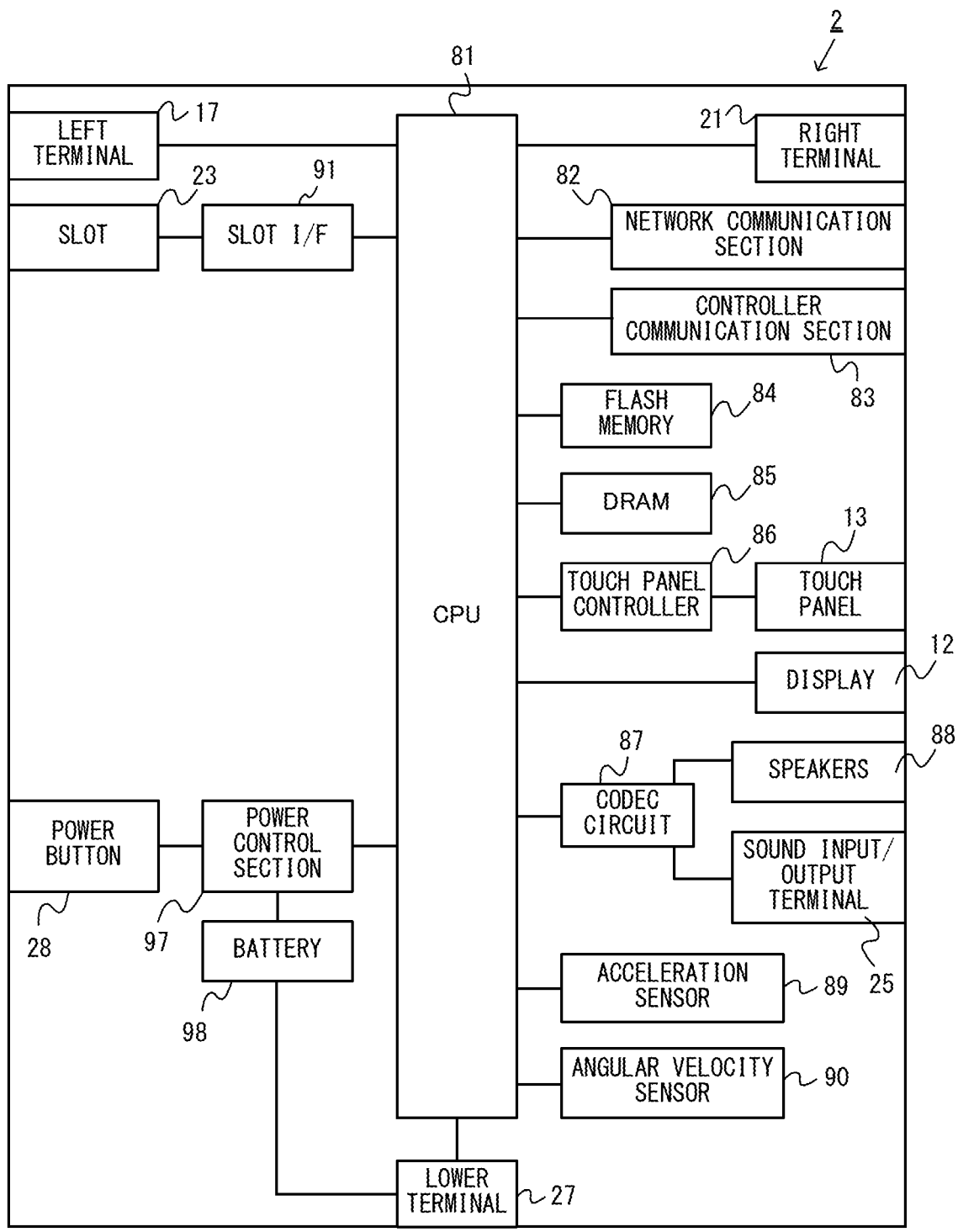
FIG. 6 is a block diagram showing a non-limiting example of the internal configuration of the main body apparatus 2.

FIG. 6 is a block diagram showing an example of the internal configuration of the main body apparatus 2. The main body apparatus 2 includes components 81 to 91, 97, and 98 shown in FIG. 6 in addition to the components shown in FIG. 3. Some of the components 81 to 91, 97, and 98 may be mounted as electronic components on an electronic circuit board and accommodated in the housing 11.

The main body apparatus 2 includes a CPU (Central Processing Unit) 81. The CPU 81 is an information processing section for executing various types of information processing to be executed by the main body apparatus 2. To be exact, the CPU 81 is a SoC (System-on-a-chip) having a plurality of functions such as a CPU function and a GPU function. The CPU 81 executes an information processing program (e.g., a game program) stored in a storage section (specifically, an internal storage medium such as a flash memory 84, an external storage medium attached to the slot 23, or the like), thereby performing the various types of information processing.

The main body apparatus 2 includes a flash memory 84 and a DRAM (Dynamic Random Access Memory) 85 as examples of internal storage media built into the main body apparatus 2. The flash memory 84 and the DRAM 85 are connected to the CPU 81. The flash memory 84 is a memory mainly used to store various data (or programs) to be saved in the main body apparatus 2. The DRAM 85 is a memory used to temporarily store various data used for information processing.

The main body apparatus 2 includes a slot interface (hereinafter abbreviated as "I/F") 91. The slot I/F 91 is connected to the CPU 81. The slot I/F 91 is connected to the slot 23, and in accordance with an instruction from the CPU 81, reads and writes data from and to the predetermined type of storage medium (e.g., a dedicated memory card) attached to the slot 23.

The CPU 81 appropriately reads and writes data from and to the flash memory 84, the DRAM 85, and each of the above storage media, thereby performing the above information processing.

The main body apparatus 2 includes a network communication section 82. The network communication section 82 is connected to the CPU 81. The network communication section 82 communicates (specifically, through wireless communication) with an external apparatus via a network. In the exemplary embodiment, as a first communication form, the network communication section 82 connects to a wireless LAN and communicates with an external apparatus, using a method compliant with the Wi-Fi standard. Further, as a second communication form, the network communication section 82 wirelessly communicates with another main body apparatus 2 of the same type, using a predetermined communication method (e.g., communication based on a unique protocol or infrared light communication). It should be noted that the wireless communication in the above second communication form achieves the function of enabling so-called "local communication" in which the main body apparatus 2 can wirelessly communicate with another main body apparatus 2 placed in a closed local network area, and the plurality of main body apparatuses 2 directly communicate with each other to transmit and receive data.

The main body apparatus 2 includes a controller communication section 83. The controller communication section 83 is connected to the CPU 81. The controller communication section 83 wirelessly communicates with the left controller 3 and/or the right controller 4. The communication method between the main body apparatus 2 and the left controller 3 and the right controller 4 is optional. In the exemplary embodiment, the controller communication section 83 performs communication compliant with the Bluetooth (registered trademark) standard with the left controller 3 and with the right controller 4.

The CPU 81 is connected to the left terminal 17, the right terminal 21, and the lower terminal 27. When performing wired communication with the left controller 3, the CPU 81 transmits data to the left controller 3 via the left terminal 17 and also receives operation data from the left controller 3 via the left terminal 17. Further, when performing wired communication with the right controller 4, the CPU 81 transmits data to the right controller 4 via the right terminal 21 and also receives operation data from the right controller 4 via the right terminal 21. Further, when communicating with the cradle, the CPU 81 transmits data to the cradle via the lower terminal 27. As described above, in the exemplary embodiment, the main body apparatus 2 can perform both wired communication and wireless communication with each of the left controller 3 and the right controller 4. Further, when the unified apparatus obtained by attaching the left controller 3 and the right controller 4 to the main body apparatus 2 or the main body apparatus 2 alone is attached to the cradle, the main body apparatus 2 can output data (e.g., image data or sound data) to the stationary monitor or the like via the cradle.

Here, the main body apparatus 2 can communicate with a plurality of left controllers 3 simultaneously (in other words, in parallel). Further, the main body apparatus 2 can communicate with a plurality of right controllers 4 simultaneously (in other words, in parallel). Thus, the user can provide inputs to the main body apparatus 2 using a plurality of left controllers 3 and a plurality of right controllers 4.

The main body apparatus 2 includes a touch panel controller 86, which is a circuit for controlling the touch panel 13. The touch panel controller 86 is connected between the touch panel 13 and the CPU 81. Based on a signal from the touch panel 13, the touch panel controller 86 generates, for example, data indicating the position where a touch input is provided. Then, the touch panel controller 86 outputs the data to the CPU 81.

Further, the display 12 is connected to the CPU 81. The CPU 81 displays a generated image (e.g., an image generated by executing the above information processing) and/or an externally acquired image on the display 12.

The main body apparatus 2 includes a codec circuit 87 and speakers (specifically, a left speaker and a right speaker) 88. The codec circuit 87 is connected to the speakers 88 and a sound input/output terminal 25 and also connected to the CPU 81. The codec circuit 87 is a circuit for controlling the input and output of sound data to and from the speakers 88 and the sound input/output terminal 25.

Further, the main body apparatus 2 includes an acceleration sensor 89. In the exemplary embodiment, the acceleration sensor 89 detects the magnitudes of accelerations along predetermined three axial (e.g., xyz axes shown in FIG. 1) directions. It should be noted that the acceleration sensor 89 may detect an acceleration along one axial direction or accelerations along two axial directions.

Further, the main body apparatus 2 includes an angular velocity sensor 90. In the exemplary embodiment, the angular velocity sensor 90 detects angular velocities about predetermined three axes (e.g., the xyz axes shown in FIG. 1). It should be noted that the angular velocity sensor 90 may detect an angular velocity about one axis or angular velocities about two axes.

The acceleration sensor 89 and the angular velocity sensor 90 are connected to the CPU 81, and the detection results of the acceleration sensor 89 and the angular velocity sensor 90 are output to the CPU 81. Based on the detection results of the acceleration sensor 89 and the angular velocity sensor 90, the CPU 81 can calculate information regarding the motion and/or the orientation of the main body apparatus 2.

The main body apparatus 2 includes a power control section 97 and a battery 98. The power control section 97 is connected to the battery 98 and the CPU 81. Further, although not shown in FIG. 6, the power control section 97 is connected to components of the main body apparatus 2 (specifically, components that receive power supplied from the battery 98, the left terminal 17, and the right terminal 21). Based on a command from the CPU 81, the power control section 97 controls the supply of power from the battery 98 to the above components.

Further, the battery 98 is connected to the lower terminal 27. When an external charging device (e.g., the cradle) is connected to the lower terminal 27, and power is supplied to the main body apparatus 2 via the lower terminal 27, the battery 98 is charged with the supplied power.

Figure 7:
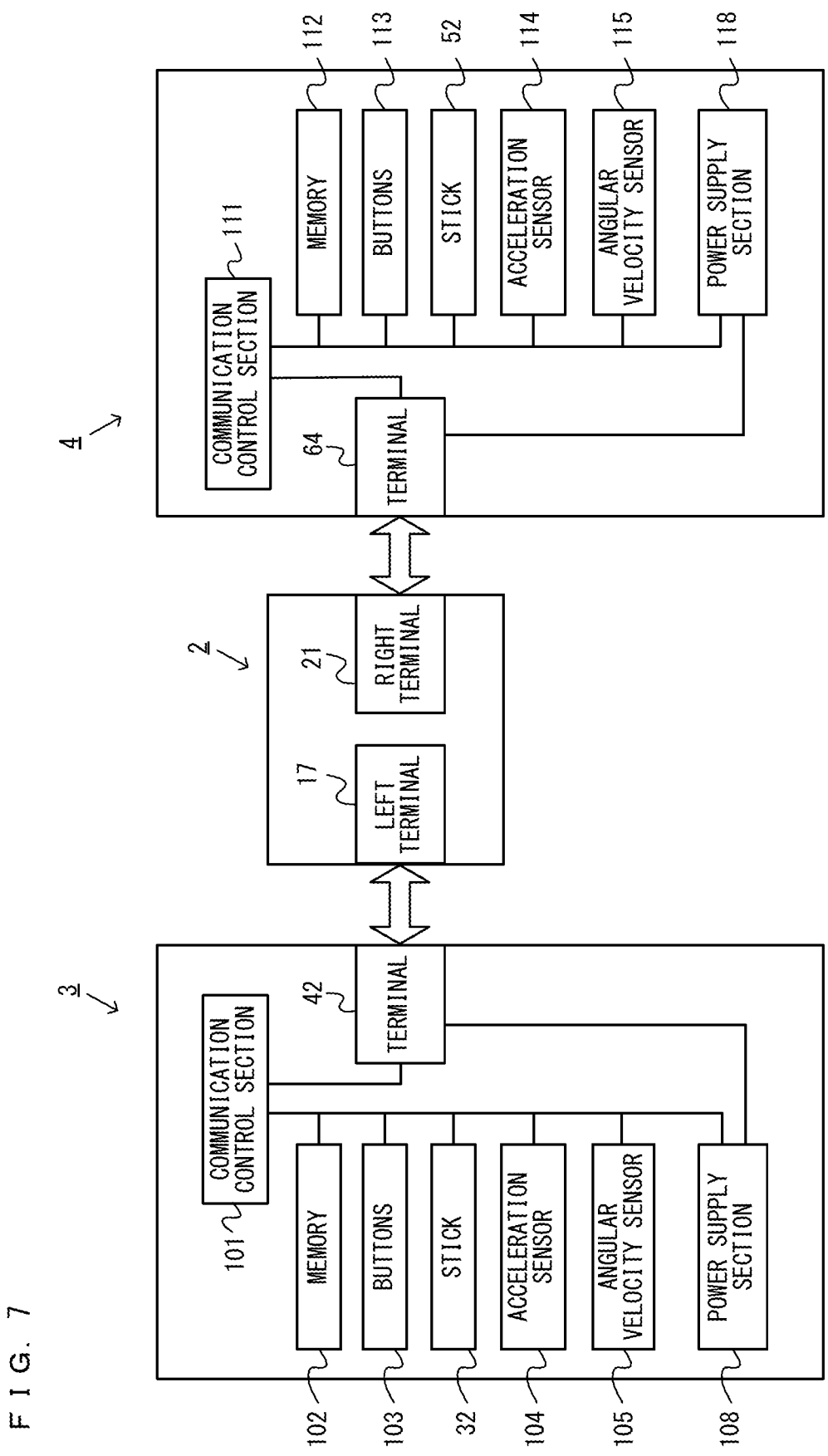
FIG. 7 is a block diagram showing a non-limiting example of the internal configuration of the game system 1.

FIG. 7 is a block diagram showing examples of the internal configurations of the main body apparatus 2, the left controller 3, and the right controller 4. It should be noted that the details of the internal configuration of the main body apparatus 2 are shown in FIG. 6 and therefore are omitted in FIG. 7.

The left controller 3 includes a communication control section 101, which communicates with the main body apparatus 2. As shown in FIG. 7, the communication control section 101 is connected to components including the terminal 42. In the exemplary embodiment, the communication control section 101 can communicate with the main body apparatus 2 through both wired communication via the terminal 42 and wireless communication not via the terminal 42. The communication control section 101 controls the method for communication performed by the left controller 3 with the main body apparatus 2. That is, when the left controller 3 is attached to the main body apparatus 2, the communication control section 101 communicates with the main body apparatus 2 via the terminal 42. Further, when the left controller 3 is detached from the main body apparatus 2, the communication control section 101 wirelessly communicates with the main body apparatus 2 (specifically, the controller communication section 83). The wireless communication between the communication control section 101 and the controller communication section 83 is performed in accordance with the Bluetooth (registered trademark) standard, for example.

Further, the left controller 3 includes a memory 102 such as a flash memory. The communication control section 101 includes, for example, a microcomputer (or a microprocessor) and executes firmware stored in the memory 102, thereby performing various processes.

The left controller 3 includes buttons 103 (specifically, the buttons 33 to 39, 43, 44, and 47). Further, the left controller 3 includes the analog stick ("stick" in FIG. 7) 32. Each of the buttons 103 and the analog stick 32 outputs information regarding an operation performed on itself to the communication control section 101 repeatedly at appropriate timing.

The left controller 3 includes inertial sensors. Specifically, the left controller 3 includes an acceleration sensor 104. Further, the left controller 3 includes an angular velocity sensor 105. In the exemplary embodiment, the acceleration sensor 104 detects the magnitudes of accelerations along predetermined three axial (e.g., xyz axes shown in FIG. 4) directions. It should be noted that the acceleration sensor 104 may detect an acceleration along one axial direction or accelerations along two axial directions. In the exemplary embodiment, the angular velocity sensor 105 detects angular velocities about predetermined three axes (e.g., the xyz axes shown in FIG. 4). It should be noted that the angular velocity sensor 105 may detect an angular velocity about one axis or angular velocities about two axes. Each of the acceleration sensor 104 and the angular velocity sensor 105 is connected to the communication control section 101. Then, the detection results of the acceleration sensor 104 and the angular velocity sensor 105 are output to the communication control section 101 repeatedly at appropriate timing.

The communication control section 101 acquires information regarding an input (specifically, information regarding an operation or the detection result of the sensor) from each of input sections (specifically, the buttons 103, the analog stick 32, and the sensors 104 and 105). The communication control section 101 transmits operation data including the acquired information (or information obtained by performing predetermined processing on the acquired information) to the main body apparatus 2. It should be noted that the operation data is transmitted repeatedly, once every predetermined time. It should be noted that the interval at which the information regarding an input is transmitted from each of the input sections to the main body apparatus 2 may or may not be the same.

The above operation data is transmitted to the main body apparatus 2, whereby the main body apparatus 2 can obtain inputs provided to the left controller 3. That is, the main body apparatus 2 can determine operations on the buttons 103 and the analog stick 32 based on the operation data. Further, the main body apparatus 2 can calculate information regarding the motion and/or the orientation of the left controller 3 based on the operation data (specifically, the detection results of the acceleration sensor 104 and the angular velocity sensor 105).

The left controller 3 includes a power supply section 108. In the exemplary embodiment, the power supply section 108 includes a battery and a power control circuit. Although not shown in FIG. 7, the power control circuit is connected to the battery and also connected to components of the left controller 3 (specifically, components that receive power supplied from the battery).

As shown in FIG. 7, the right controller 4 includes a communication control section 111, which communicates with the main body apparatus 2. Further, the right controller 4 includes a memory 112, which is connected to the communication control section 111. The communication control section 111 is connected to components including the terminal 64. The communication control section 111 and the memory 112 have functions similar to those of the communication control section 101 and the memory 102, respectively, of the left controller 3. Thus, the communication control section 111 can communicate with the main body apparatus 2 through both wired communication via the terminal 64 and wireless communication not via the terminal 64 (specifically, communication compliant with the Bluetooth (registered trademark) standard). The communication control section 111 controls the method for communication performed by the right controller 4 with the main body apparatus 2.

The right controller 4 includes input sections similar to the input sections of the left controller 3. Specifically, the right controller 4 includes buttons 113, the analog stick 52, and inertial sensors (an acceleration sensor 114 and an angular velocity sensor 115). These input sections have functions similar to those of the input sections of the left controller 3 and operate similarly to the input sections of the left controller 3.

The right controller 4 includes a power supply section 118. The power supply section 118 has a function similar to that of the power supply section 108 of the left controller 3 and operates similarly to the power supply section 108.

As describe above, in the game system 1 according to the exemplary embodiment, the left controller 3 and the right controller 4 are attachable to and detachable from the main body apparatus 2. Further, the unified apparatus obtained by attaching the left controller 3 and the right controller 4 to the main body apparatus 2 or the main body apparatus 2 alone is attached to the cradle and thereby can output an image (and a sound) to the stationary monitor 6. A description is given below using the game system in use forms in which an image (and a sound) is output to the stationary monitor 6 by attaching the main body apparatus 2 alone to the cradle in the state where the left controller 3 and the right controller 4 are detached from the main body apparatus 2.

As described above, in the exemplary embodiment, the game system 1 can also be used in the state where the left controller 3 and the right controller 4 are detached from the main body apparatus 2 (referred to as a "separate state"). As a form in a case where an operation is performed on an application (e.g., a game application) using the game system 1 in the separate state, a form in which a single user uses both the left controller 3 and the right controller 4 is possible. It should be noted that when a single user uses both the left controller 3 and the right controller 4, the user can also use an accessory device (e.g., an extension grip 350 described later) for joining the left controller 3 and the right controller 4 to cause the left controller 3 and the right controller 4 to function as a single operation device. It should be noted that when a plurality of users perform operations using the same application, a form is possible in which a plurality of sets of the left controller 3 and the right controller 4 are prepared, and each user uses one of the plurality of sets.

Figure 8:
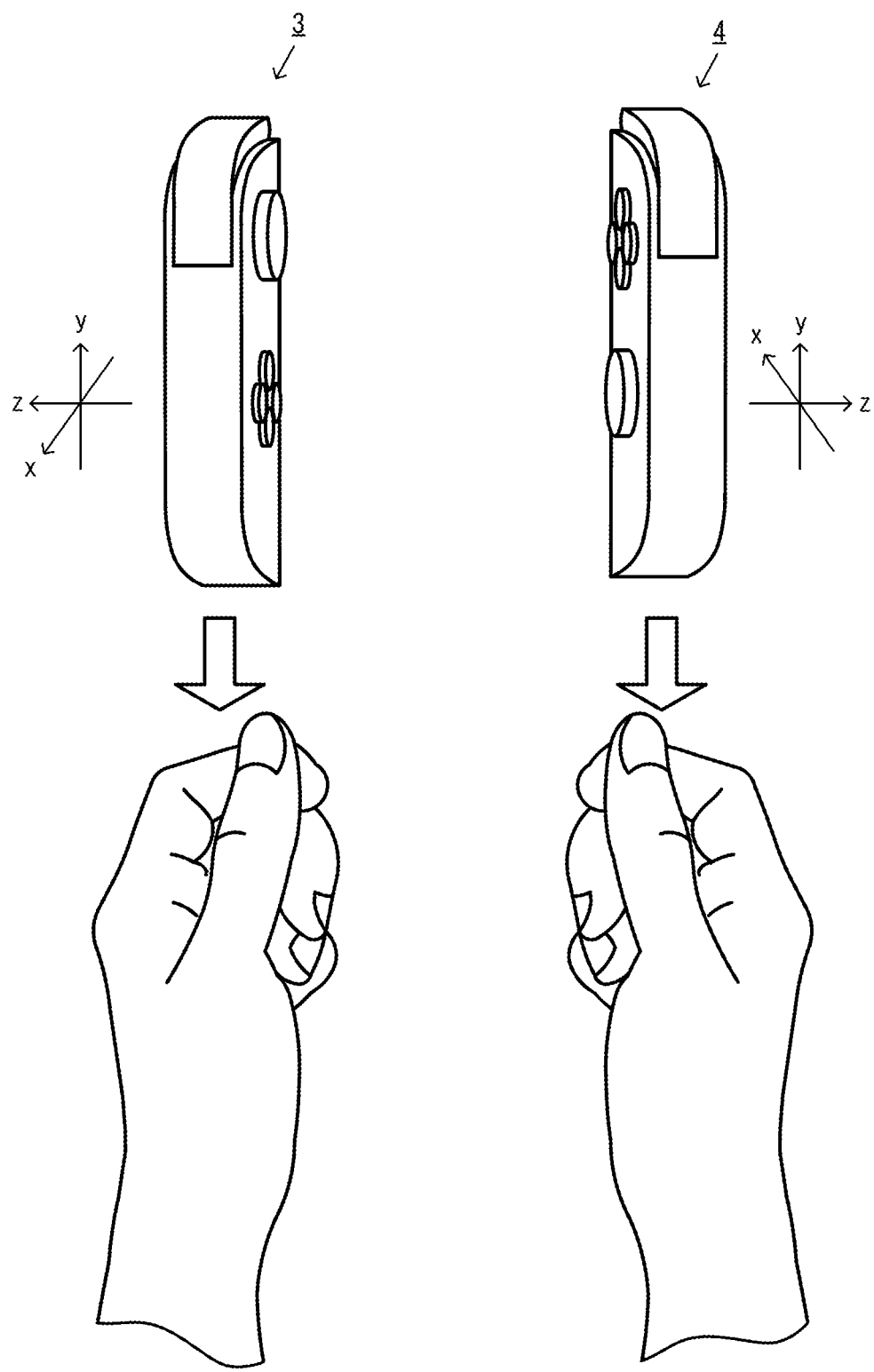
FIG. 8 is a diagram showing a non-limiting example of the state where a single user uses the game system 1 by holding a set of the left controller 3 and the right controller 4 in a separate state.
Figure 10:
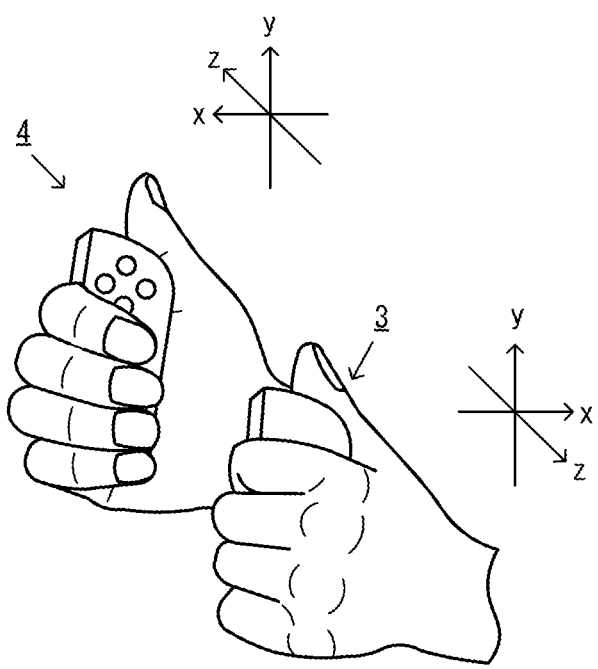
FIG. 10 is a diagram showing a non-limiting example of the state where a single user uses the game system 1 by holding the set of the left controller 3 and the right controller 4 in the separate state.

FIGS. 8 to 10 are diagrams showing an example of the state where a single user uses the game system 1 by holding a set of the left controller 3 and the right controller 4 in the separate state. As shown in FIGS. 11 to 13, in the separate state, the user can view an image displayed on the stationary monitor 6 while operating the left controller 3 and the right controller 4 by holding the left controller 3 with their left hand and the right controller 4 with their right hand.

For example, in the exemplary embodiment, the user holds the left controller 3 with their left hand such that the down direction of the longitudinal direction of the left controller 3 (the down direction (the negative y-axis direction) shown in FIG. 1), which is vertically long and approximately plate-shaped, is the vertical direction, also the side surface that is in contact with the main body apparatus 2 when the left controller 3 is attached to the main body apparatus 2 is directed forward, and also the main surface of the left controller 3 (the surface on which the analog stick 32 is provided) is directed to the right. That is, the left controller 3 held with the left hand of the user is in the state where the negative x-axis direction is directed in the forward direction of the user, and the positive z-axis direction is directed to the left. Further, the user holds the right controller 4 with their right hand such that the down direction of the longitudinal direction of the right controller 4 (the down direction (the negative y-axis direction) shown in FIG. 1), which is vertically long and approximately plate-shaped, is the vertical direction, also the side surface that is in contact with the main body apparatus 2 when the right controller 4 is attached to the main body apparatus 2 is directed forward, and also the main surface of the right controller 4 (the surface on which the analog stick 52 is provided) is directed to the left. That is, the right controller 4 held with the right hand of the user is in the state where the positive x-axis direction is directed in the forward direction of the user, and the positive z-axis direction is directed to the right.

In the state where the left controller 3 is held with the left hand, and the right controller 4 is held with the right hand (hereinafter, such an operation method will occasionally be referred to as a "two-hand-held operation method", and the orientations of the left controller 3 and the right controller 4 held in these directions will occasionally be referred to as "basic orientations"), each controller is moved in up, down, left, right, front, and back directions, rotated, or swung, whereby game play is performed in accordance with the motion or the orientation of the controller. Then, in the above game play, the acceleration sensor 104 of the left controller 3 can detect accelerations in the xyz-axis directions as operation inputs, and the angular velocity sensor 105 can detect angular velocities about the xyz-axis directions as operation inputs. Further, the acceleration sensor 114 of the right controller 4 can detect accelerations in the xyz-axis directions as operation inputs, and the angular velocity sensor 115 can detect angular velocities about the xyz-axis directions as operation inputs. Further, in the two-hand-held operation, it is possible to perform the operation of pressing the first L-button 38 with the thumb of the left hand of the user and perform the operation of pressing the first R-button 60 with the thumb of the right hand of the user, and game play is also performed by these button operations (see FIG. 9).

Further, when the user performs game play by holding the left controller 3 and the right controller 4, vibrations are imparted to the left controller 3 and/or the right controller 4 in accordance with the situation of this game. As described above, the left controller 3 includes the vibrator 107, and the right controller 4 includes the vibrator 117. The CPU 81 of the main body apparatus 2 transmits vibration data to the left controller 3 and/or the right controller 4 in accordance with the situation of an executed game and thereby can vibrate the vibrator 107 and/or the vibrator 117 at an amplitude and a frequency corresponding to the vibration data.

Next, FIGS. 11 to 13 are diagrams showing examples of a game image displayed in a game played by moving the left controller 3 and the right controller 4. As shown in FIG. 11, in this exemplary game, an image of a game (e.g., a boxing game) in which a player object PO and an enemy object EO compete against each other is displayed on the stationary monitor 6. Then, the user operating the left controller 3 and the right controller 4 can operate the player object PO by swinging the main body of the left controller 3 and/or the main body of the right controller 4, changing the orientations of the main body of the left controller 3 and/or the main body of the right controller 4, or pressing an operation button (e.g., the first L-button 38 or the first R-button 60).

For example, the user swings the left controller 3 and thereby can control the action of a first object G1, which represents a left glove (a left fist) of the player object PO. The user swings the right controller 4 and thereby can control the action of a second object G2, which represents a right glove (a right fist) of the player object PO. Specifically, when the user performs the operation of swinging so as to throw a left punch using the left hand holding the left controller 3, the first object G1, which represents the left glove of the player object PO, moves toward the place where the enemy object EO is placed. Further, when the user performs the operation of swinging so as to throw a right punch using the right hand holding the right controller 4, the second object G2, which represents the right glove of the player object PO, moves toward the place where the enemy object EO is placed.

Specifically, when the right controller 4 is swung so as to be pushed forward (in the positive x-axis direction of the right controller 4) in the state where neither of the left controller 3 and the right controller 4 moves (the state shown in FIG. 11), then as shown in FIG. 12, the second object G2 of the player object PO moves toward the enemy object EO in accordance with the motion of the right controller 4. Consequently, a game image is displayed such that the player object PO throws a right punch at the enemy object EO. Further, when the left controller 3 is swung so as to be pushed forward (in the negative x-axis direction of the left controller 3) in the state where neither of the left controller 3 and the right controller 4 moves, the first object G1 of the player object PO moves toward the enemy object EO in accordance with the motion of the left controller 3. Consequently, a game image is displayed such that the player object PO throws a left punch at the enemy object EO.

Here, the moving direction of the first object G1 starting moving is set by the orientation of the left controller 3 when the left controller 3 is swung so as to be pushed forward. Further, the moving direction of the second object G2 starting moving is set by the orientation of the right controller 4 when the right controller 4 is moved so as to be pushed forward. For example, when the right controller 4 moves in the positive x-axis direction as shown in FIG. 12, the moving direction of the second object G2 is set in accordance with the orientation in a roll direction of the right controller 4 in this movement. As an example, in the exemplary embodiment, in the period in which the right controller 4 moves, the tilt in the y-axis direction of the right controller 4 with respect to the direction in which a gravitational acceleration acts in real space is calculated, and the moving direction of the second object G2 is calculated based on the tilt in the y-axis direction. Specifically, when the tilt in the y-axis direction indicates that the right controller 4 is in the orientation in which the right controller 4 roll-rotates in the right direction with respect to the above reference orientation, the second object G2 moves in the right direction in a virtual space. Further, when the tilt in the y-axis direction indicates that the right controller 4 is in the orientation in which the right controller 4 roll-rotates in the left direction with respect to the reference orientation, the second object G2 moves in the left direction in the virtual space. Then, the angle at which the moving direction shifts in the right direction or the left direction is calculated in accordance with the tilt angle in the y-axis direction.

Further, in this exemplary game, even when the distance between the player object PO and the enemy object EO is relatively long in the virtual space, it is possible to throw a punch. The arms of the player object PO extend, whereby the first object G1 and the second object G2 can move by a relatively long distance. Then, the first object G1 or the second object G2 collides with another object (e.g., the enemy object EO) or moves by a predetermined distance, then finishes the movement, and returns to a movement start position where the first object G1 or the second object G2 starts moving (e.g., a hand portion of the player object PO shown in FIG. 11). The first object G1 and the second object G2 return to the movement start positions and thereby can make a next movement toward the enemy object EO. In other words, it is possible to throw a next punch. Thus, the time from when the first object G1 or the second object G2 starts moving from the movement start position to when the first object G1 or the second object G2 returns to the movement start position again is longer than in a general boxing game.

Further, in this exemplary game, even while the first object G1 or the second object G2 is moving using such a movement time (typically, the period in which the first object G1 or the second object G2 is moving in the direction of the enemy object EO), it is possible to change a trajectory moving in accordance with the orientation or the motion of the left controller 3 or the right controller 4. For example, when the left controller 3 or the right controller 4 rotates in the roll direction or rotates in a yaw direction from the orientation of the left controller 3 or the right controller 4 when the first object G1 or the second object G2 starts moving, the trajectory of the first object G1 or the second object G2 is changed in accordance with the rotation.

As an example, in the exemplary embodiment, in the state where the rotational velocity (the angular velocity) about the x-axis of the left controller 3 or the right controller 4 after the first object G1 or the second object G2 starts moving is the rotation in the roll direction, the trajectory of the first object G1 or the second object G2 moving based on this rotational velocity about the x-axis is changed. Specifically, when the rotational velocity of the left controller 3 roll-rotating in the right direction about the x-axis while the first object G1 is moving is obtained, the trajectory of the first object G1 is changed in the right direction in the virtual space. When the rotational velocity of the left controller 3 roll-rotating in the left direction about the x-axis is obtained, the trajectory of the first object G1 is changed in the left direction in the virtual space. Further, when the rotational velocity of the right controller 4 roll-rotating in the right direction about the x-axis while the second object G2 is moving is obtained, the trajectory of the second object G2 is changed in the right direction in the virtual space. When the rotational velocity of the right controller 4 roll-rotating in the left direction about the x-axis is obtained, the trajectory of the second object G2 is changed in the left direction in the virtual space.

As another example, in the exemplary embodiment, in the state where the rotational velocity (the angular velocity) of the left controller 3 or the right controller 4 about the direction of gravity in real space after the first object G1 or the second object G2 starts moving is the rotation in the yaw direction, the trajectory of the first object G1 or the second object G2 moving based on this rotational velocity is changed. Specifically, when the rotational velocity of the left controller 3 yaw-rotating in the right direction about the direction of gravity while the first object G1 is moving is obtained, the trajectory of the first object G1 is changed in the right direction in the virtual space. When the rotational velocity of the left controller 3 yaw-rotating in the left direction about the direction of gravity is obtained, the trajectory of the first object G1 is changed in the left direction in the virtual space. Further, when the rotational velocity of the right controller 4 yaw-rotating in the right direction about the direction of gravity while the second object G2 is moving is obtained, the trajectory of the second object G2 is changed in the right direction in the virtual space. When the rotational velocity of the right controller 4 yaw-rotating in the left direction about the direction of gravity is obtained, the trajectory of the second object G2 is changed in the left direction in the virtual space.

Further, in this exemplary game, using the magnitude of an acceleration generated in the left controller 3 or the right controller 4, it is determined whether or not the left controller 3 or the right controller 4 is swung. Then, when it is determined that the left controller 3 is swung in the negative x-axis direction in the state where the first object G1 is placed at the movement start position, the first object G1 starts moving from the movement start position toward the enemy object EO. Further, when it is determined that the right controller 4 is swung in the positive x-axis direction in the state where the second object G2 is placed at the movement start position, the second object G2 starts moving from the movement start position toward the enemy object EO.

Figure 16:
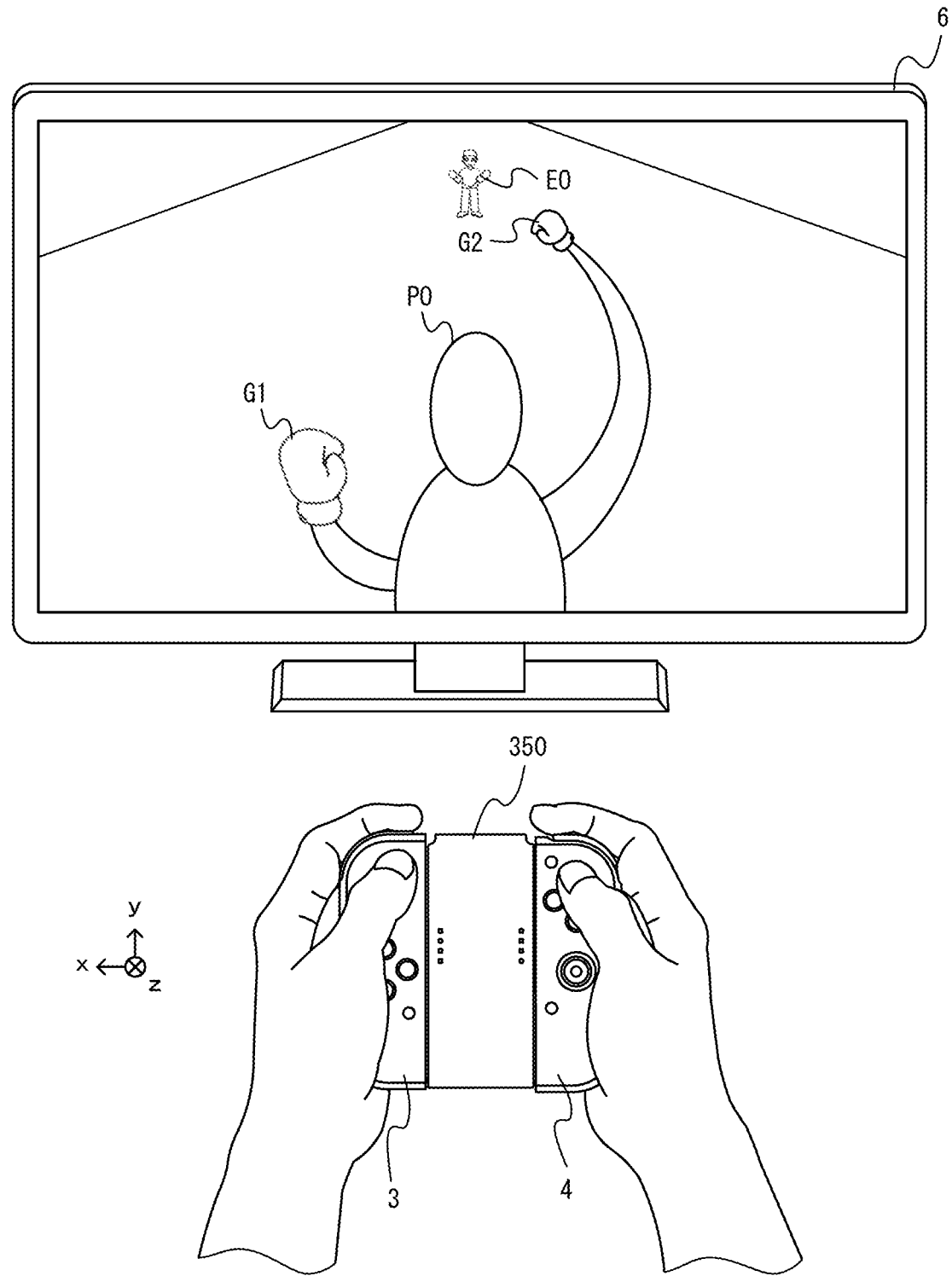
FIG. 16 is a diagram showing a non-limiting example of the accessory device to which the left controller 3 and the right controller 4 are attachable.

Further, in this exemplary game, even when one of the first object G1 and the second object G2 starts moving from the movement start position and is moving, it is possible to cause also the other of the first object G1 and the second object G2 to start moving from the movement start position. For example, as shown in FIG. 16, the user swings the right controller 4 so as to push the right controller 4 forward (in the positive x-axis direction of the right controller 4), whereby the second object G2 starts moving toward the enemy object EO. Then, the user swings the left controller 3 so as to push the left controller 3 forward (in the negative x-axis direction of the left controller 3) during the movement of the second object G2, whereby the first object G1 also starts moving toward the enemy object EO. Thus, on the stationary monitor 6 shown in FIG. 16, a game image is displayed in which both the first object G1 and the second object G2 move toward the enemy object EO. Further, FIG. 16 shows an example of a game image in which the second object G2 having started moving first collides with (hits) the enemy object EO.

Here, in this exemplary game, vibrations are imparted to the left controller 3 and/or the right controller 4 in accordance with the states of the first object G1 and/or the second object G2 in a virtual game world. As an example, in this exemplary game, when the first object G1 moves in the virtual game world, a vibration corresponding to the type, the moving velocity, the moving direction, the collision state, and the like of the first object G1 is imparted to the left controller 3. Further, when the second object G2 moves in the virtual game world, a vibration corresponding to the type, the moving velocity, the moving direction, the collision state, and the like of the second object G2 is imparted to the right controller 4.

Further, in this exemplary game, it is possible to move the player object PO or cause the player object PO to perform an action in the virtual game world in accordance with the motions or the orientations of both the left controller 3 and the right controller 4. For example, when both the left controller 3 and the right controller 4 rotate in a pitch direction or rotate in the roll direction in real space, the player object PO is caused to move in accordance with the tilts of the rotations. Specifically, the tilts in the x-axis direction and the y-axis direction of the left controller 3 and the tilts in the x-axis direction and the y-axis direction of the right controller 4 with respect to the direction of gravity in real space are calculated. Then, based on these tilts, when it is determined that both the left controller 3 and the right controller 4 are in the orientations in which the left controller 3 and the right controller 4 are tilted forward, the player object PO is caused to move forward in the virtual game world by the amount of movement corresponding to the angles at which both the left controller 3 and the right controller 4 are tilted forward (e.g., the average value of these angles). Further, based on these tilts, when it is determined that both the left controller 3 and the right controller 4 are in the orientations in which the left controller 3 and the right controller 4 are tilted backward, the player object PO is caused to move backward in the virtual game world by the amount of movement corresponding to the angles at which both the left controller 3 and the right controller 4 are tilted backward (e.g., the average value of these angles). Further, based on these tilts, when it is determined that both the left controller 3 and the right controller 4 are in the orientations in which the left controller 3 and the right controller 4 are tilted to the left, the player object PO is caused to move to the left in the virtual game world by the amount of movement corresponding to the angles at which both the left controller 3 and the right controller 4 are tilted to the left (e.g., the average value of these angles). Further, based on these tilts, when it is determined that both the left controller 3 and the right controller 4 are in the orientations in which the left controller 3 and the right controller 4 are tilted to the right, the player object PO is caused to move to the right in the virtual game world by the amount of movement corresponding to the angles at which both the left controller 3 and the right controller 4 are tilted to the right (e.g., the average value of these angles). Further, based on these tilts, when it is determined that both the left controller 3 and the right controller 4 are in the orientations in which the left controller 3 and the right controller 4 are tilted inward, the player object PO performs the action of defending against an attack from the enemy object EO in the virtual game world.

Further, in this exemplary game, in accordance with operations on the operation buttons of the left controller 3 and the right controller 4, it is possible to cause the player object PO to move or perform an action in the virtual space. For example, when the first L-button 38 of the left controller 3 is subjected to a pressing operation, the player object PO moves dashing (moves rapidly) in the virtual game world. Further, when the first R-button 60 of the right controller 4 is subjected to a pressing operation, the player object PO jumps in the virtual game world.

Further, in the exemplary embodiment, it is also possible to play the above game using an attachment (an accessory device) for attaching the left controller 3 and the right controller 4 to cause the left controller 3 and the right controller 4 to function as a single operation device.

Figure 14:
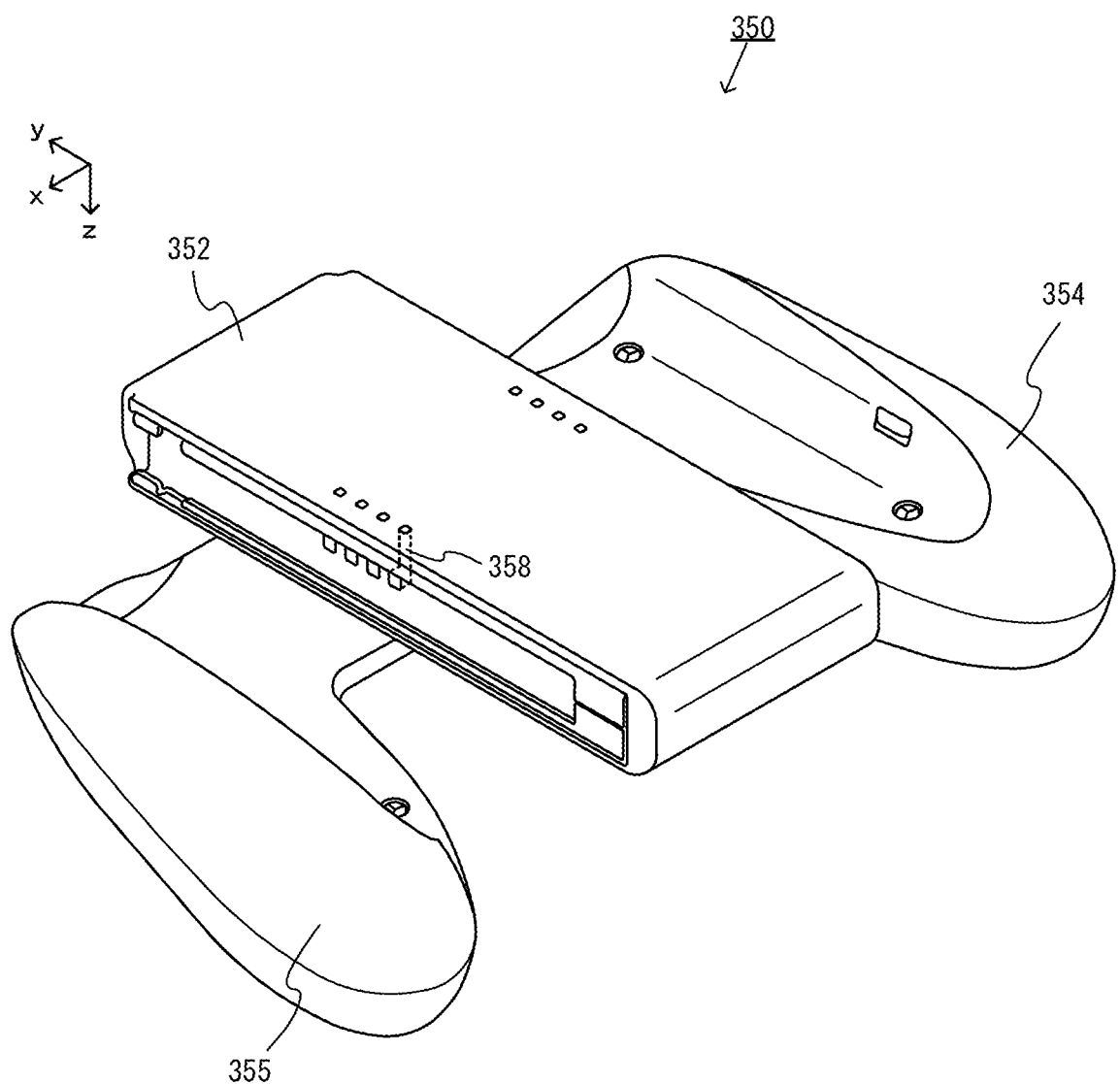
FIG. 14 is a diagram showing a non-limiting example of an accessory device to which the left controller 3 and the right controller 4 are attachable.
Figure 15:
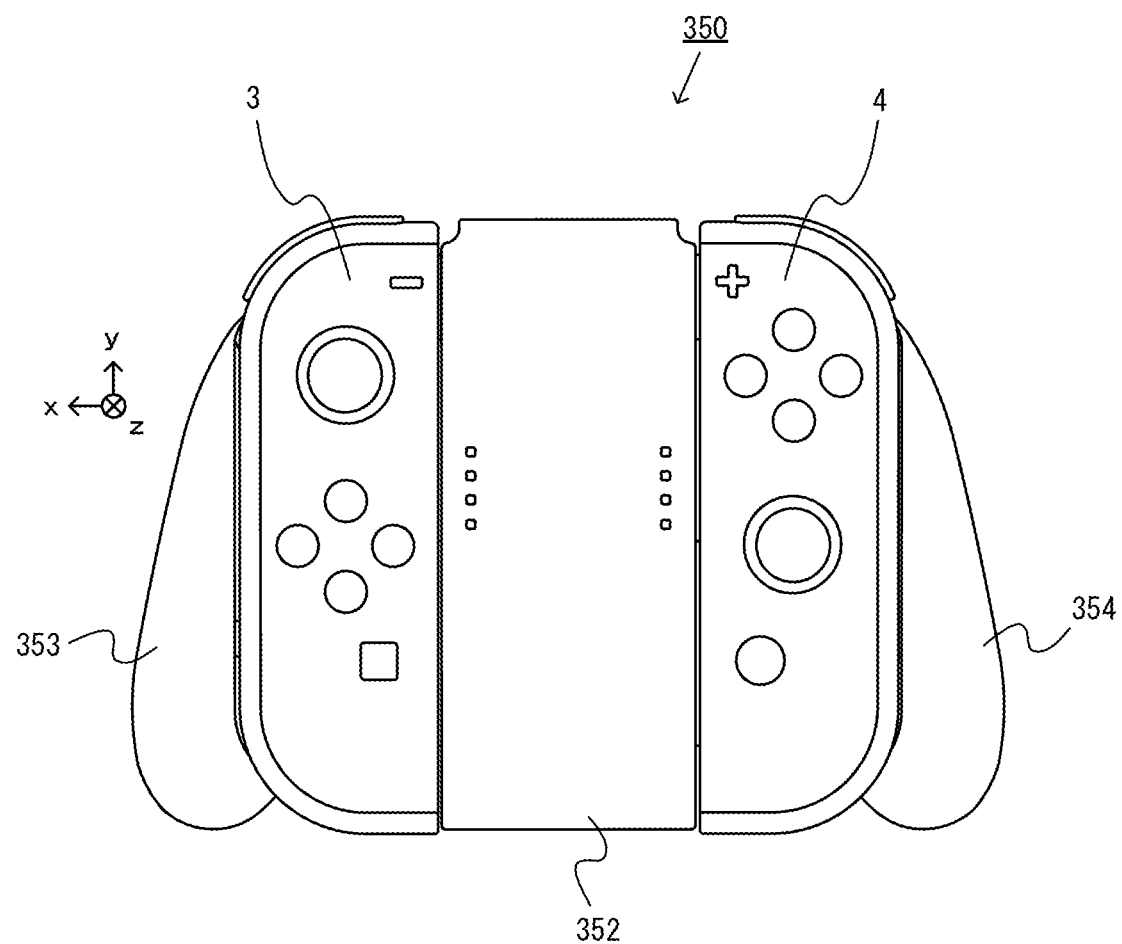
FIG. 15 is a diagram showing a non-limiting example of the accessory device to which the left controller 3 and the right controller 4 are attachable.

FIGS. 14 and 15 are diagrams showing an example of an accessory device to which the left controller 3 and the right controller 4 are attachable. As shown in FIGS. 14 and 15, an extension grip 350, which is an example of the accessory device, is an accessory device used by the user to perform an operation. The left controller 3 is attachable to the extension grip 350, and the right controller 4 is also attachable to the extension grip 350. Thus, with the extension grip 350, the user can perform an operation (hereinafter, such an operation method will occasionally be referred to as an "extension grip operation method") by holding, in a unified manner, the two controllers 3 and 4 detached from the main body apparatus 2.

The extension grip 350 includes a main body portion 351 and a supporting portion 352. The main body portion 351 includes a left grip portion 353, which is held by the user with their left hand, and a right grip portion 354, which is held by the user with their right hand. Thus, the main body portion 351 can also be said to be a holding portion. Further, the main body portion 351 includes a connection portion 355.

The connection portion 355 connects the left grip portion 353 and the right grip portion 354. The connection portion 355 is, for example, a member extending in the horizontal direction (i.e., an x-axis direction shown in FIGS. 14 and 15). The left grip portion 353 is provided in a left end portion of the connection portion 355, and the right grip portion 354 is provided in a right end portion of the connection portion 355. The left grip portion 353 is shaped to extend in the up-down direction (i.e., a y-axis direction shown in FIGS. 14 and 15). Similarly to the left grip portion 353, the right grip portion 354 is also shaped to extend in the up-down direction. It should be noted that to be exact, the left grip portion 353 and the right grip portion 354 are shaped to extend in directions slightly obliquely inclined with respect to the up-down direction. Specifically, the left grip portion 353 and the right grip portion 354 are inclined in such directions that the further downward from portions in which the left grip portion 353 and the right grip portion 354 are connected the connection portion 355, the further away the left grip portion 353 and the right grip portion 354 are from each other. The grip portions 353 and 354 have such shapes, whereby the user can comfortably hold the grip portions 353 and 354 and comfortably operate the controllers 3 and 4 attached to the extension grip 350.

In the exemplary embodiment, the main body portion 351 is formed of a single housing (in other words, a housing formed in a unified manner). In the exemplary embodiment, the housing of the main body portion 351 is composed of a resin. It should be noted that in another exemplary embodiment, the main body portion 351 may have a configuration in which a plurality of housings (e.g., housings for the respective components 353 to 355) are connected together.

The supporting portion 352 is a member for supporting the controllers 3 and 4. As shown in FIGS. 14 and 15, the supporting portion 352 is joined to the main body portion 351 (specifically, the connection portion 355 of the main body portion 351). The supporting portion 352 (in other words, a housing of the supporting portion 352) has an approximately cuboid outer shape, and a back surface (i.e., a surface further in the positive z-axis direction) of the supporting portion 352 is joined to a front surface (i.e., the surface further in the negative z-axis direction) of the connection portion 355. It should be noted that in the exemplary embodiment, the housing of the supporting portion 352 is composed of a resin. Further, the main body portion 351 and the supporting portion 352 may be formed in a unified manner, and the main body portion 351 and the supporting portion 352 may be formed of a single housing.

To the extension grip 350, the left controller 3 and the right controller 4 can be simultaneously attached. Specifically, on a left side surface (i.e., a surface further in the positive x-axis direction) of the supporting portion 352, the extension grip 350 includes a mechanism similar to the mechanism of the main body apparatus 2 for attaching the left controller 3 to its left side surface. Further, on a right side surface (i.e., a surface further in the negative x-axis direction) of the supporting portion 352, the extension grip 350 includes a mechanism similar to the mechanism of the main body apparatus 2 for attaching the right controller 4 to its right side surface. Then, as shown in FIG. 15, when the left controller 3 and the right controller 4 are attached to the extension grip 350, the left controller 3 is on the left side of the right controller 4, and the left controller 3 and the right controller 4 are supported by the extension grip 350 such that the left controller 3 and the right controller 4 are in the same direction (i.e., the positive y-axis directions of the left controller 3 and the right controller 4 are substantially parallel and are the same direction). Further, the left grip portion 353 is placed on the left side of the left controller 3 attached to the extension grip 350, and the right grip portion 354 is placed on the right side of the right controller 4 attached to the extension grip 350. This enables the user to hold the extension grip 350 and the left controller 3 and the right controller 4 attached to the extension grip 350 as if a single controller. Further, the user can hold the left controller 3 and the right controller 4 with the feeling that the user holds the left grip portion 353 and the right grip portion 354 directly connected to the outside of the left controller 3 and the right controller 4.

It should be noted that to the extension grip 350 according to the exemplary embodiment, the left controller 3 and the right controller 4 can be attached in the state where the extension grip 350 is not electrically connected to the left controller 3 and the right controller 4. Here, user notification LEDs may be provided on an attachment surface (a right side surface further in the negative x-axis direction) of the left controller 3 or an attachment surface (a left side surface further in the positive x-axis direction) of the right controller 4. Even in such a case, the extension grip 350 has a configuration for enabling the user to view light from the notification LEDs in the state where the extension grip 350 is not electrically connected to the left controller 3 and the right controller 4.

For example, as shown in FIG. 14, on the left side surface (i.e., the surface further in the positive x-axis direction) and the right side surface (i.e., the surface further in the negative x-axis direction) of the supporting portion 352, incident surfaces of light guide paths 358 for guiding light from notification LEDs are provided corresponding to the placement positions of the notification LEDs. Then, exit surfaces of the light guide paths 358 are provided on an outer surface of the supporting portion 352 (e.g., a front surface of the supporting portion 352 (i.e., a surface further in the negative z-axis direction). This enables the user to view light from the notification LEDs of the left controller 3 and the right controller 4 in the state where the left controller 3 and the right controller 4 are attached to the extension grip 350. Even in the state where the extension grip 350 is not electrically connected to the left controller 3 and the right controller 4, it is possible to notify the user of information notified by the notification LEDs.

As shown in FIG. 16, when the above game is played using the left controller 3 and the right controller 4 unified by such an extension grip 350, an operation is performed using the operation buttons and the sticks provided in the left controller 3 and the right controller 4. For example, when the B-button 54 of the right controller 4 is subjected to a pressing operation, the player object PO throws a left punch, and the first object G1 starts moving. When the A-button 53 of the right controller 4 is subjected to a pressing operation, the player object PO throws a right punch, and the second object G2 starts moving. When the analog stick 32 of the left controller 3 is subjected to a tilt operation while the first object G1 and/or the second object G2 are moving in a virtual game world, the moving directions of the first object G1 and/or the second object G2 that are moving change in accordance with the direction of the tilt operation and the tilt angle. When the analog stick 32 of the left controller 3 is subjected to a tilt operation in a case where both the first object G1 and the second object G2 are placed at the movement start positions, the player object PO moves in the virtual game world in accordance with the direction of the tilt operation and the tilt angle. Further, when the operation of pushing in the analog stick 32 of the left controller 3 is performed in a case where both the first object G1 and the second object G2 are placed at the movement start positions, the player object PO defends against an attack from the enemy object EO in the virtual game world. When the X-button 55 of the right controller 4 is subjected to a pressing operation, the player object PO performs the action of jumping in the virtual game world. Then, when the Y-button 56 of the right controller 4 is subjected to a pressing operation, the player object PO dashes (moves rapidly) in the virtual game world. Further, also when game play is performed using the extension grip 350, vibrations are imparted to the left controller 3 and/or the right controller 4 attached to the extension grip 350 in accordance with the states of the first object G1 and/or the second object G2 in the virtual game world.

FIG. 17 is an example of an operation correspondence table indicating the actions of the player object PO for operation contents in each of the above operation methods (the two-hand-held operation method and the extension grip operation method).

As is clear from FIG. 17, even when the user wishes to cause the player object PO to perform the same action, it may be necessary to perform a different operation due to the fact that the operation method is different. For example, when the user wishes to cause the player object PO to move in the front, back, left, and right directions, then in the two-hand-held operation method, it is necessary to perform the operation of tilting the left controller 3 and the right controller 4 in the direction in which the user wishes to cause the player object PO to move. In the extension grip operation method, however, it is necessary to perform an tilt operation on a stick. Further, these operation contents have similar differences also in a case where the moving directions of the first object G1 and/or the second object G2 are changed, or the player object PO is caused to perform a defense action.

Further, when the user causes the player object PO to perform the action of throwing a left punch or a right punch, then in the two-hand-held operation method, it is necessary to perform the operation of swinging the left controller 3 or the right controller 4. In the extension grip operation method, however, it is necessary to perform the operation of pressing operation buttons assigned as described above. Further, when the user causes the player object PO to perform the action of jumping or dashing, an operation button assigned to each operation method is different.

It should be noted that a setting may be made so that even when the same operation is performed using the left controller 3 and/or the right controller 4, the corresponding game processing may be different due to the fact that the operation method is different. As an example, it is possible to make a setting so that a process corresponding to a pointing operation is different depending on the left controller 3 and/or the right controller 4.

For example, in the two-hand-held operation method, in accordance with a position indicated by the left controller 3 or the right controller 4, a predetermined object image (e.g., a cursor image) is displayed on the stationary monitor 6. Specifically, in accordance with angular velocities generated in the left controller 3, a direction indicated by the longitudinal direction (the positive y-axis direction) of the left controller 3 is calculated, and an object image is displayed such that a position on a display screen corresponding to the calculated direction is a pointing position. Then, when the direction of the longitudinal direction of the left controller 3 changes, the pointing position is moved in accordance with angular velocities generated by this change.

On the other hand, in the extension grip operation method, when an indicating operation is performed using the left controller 3 and the right controller 4 attached to the extension grip 350, then similarly, in accordance with an indicated position, a predetermined object image (e.g., a cursor image) is displayed on the stationary monitor 6. However, the amount of movement of the pointing position in accordance with a change in an indicated direction is relatively large. Specifically, in the extension grip operation method, when the direction of the longitudinal direction of the left controller 3 (or the right controller 4) changes, the amount of movement of the pointing position in accordance with angular velocities generated by this change is a magnitude obtained by multiplying the amount of movement in the two-hand-held operation method by a coefficient equal to or greater than 1. Thus, in the extension grip operation method, even when the same operation for changing an indicated direction is performed at the same angular velocities as those in the two-hand-held operation method, a correction process for making the distance at which the pointing position moves relatively great is performed. Generally, it is more difficult to perform the operation of changing the direction of a single operation device by holding the operation device with both hands than the operation of changing the direction of a single operation device by holding the operation device with one hand. However, the correction process can perform an appropriate process corresponding to the level of difficulty of the operation.

Here, in the exemplary embodiment, the extension grip 350 is not electrically connected to the left controller 3 and the right controller 4. Thus, an operation method (e.g., the two-hand-held operation method or the extension grip operation method) used by the user is determined based on the motions and/or the orientations of the left controller 3 and the right controller 4. For example, the operation method is determined by the main body apparatus 2, using data based on the motion and/or the orientation of the left controller 3 detected by a motion/orientation sensor included in the left controller 3 (e.g., the acceleration sensor 104 or the angular velocity sensor 105), and data based on the motion and/or the orientation of the right controller 4 detected by a motion/orientation sensor included in the right controller 4 (e.g., the acceleration sensor 114 or the angular velocity sensor 115). It should be noted that the determination of the operation method is made not only before the game is started, but also while the game is played. Thus, even when the user changes the operation method during the game, this change is detected, and game processing corresponding to the operation method is performed.

As a first example of the determination of the operation method used by the user, the main body apparatus 2 makes the determination based on whether or not a first condition that the difference between the orientations of the left controller 3 and the right controller 4 is within a predetermined range and a second condition that the difference between the amounts of change in the orientations of the left controller 3 and the right controller 4 is within a predetermined range are satisfied. Then, when the determinations are affirmative in both the first condition and the second condition, it is determined that the user is performing an operation using the extension grip operation method. When the determination is negative in at least one of the first condition and the second condition, it is determined that the user is performing an operation using the two-hand-held operation method.

For example, the determination based on the first condition is made as follows. When orientations with respect to the directions of the gravitational accelerations acting on the left controller 3 and the right controller 4 are calculated, and the difference between the orientations is within the predetermined range, the determination is affirmative. Here, orientations in the left-right directions in real space, which are directions about the directions of the gravitational accelerations, may be corrected so that to the orientation of one of the controllers, the orientation of the other controller is always adjusted. In the exemplary embodiment, in the state where the orientations of the left controller 3 and the right controller 4 are corrected so that the left directions (the positive x-axis directions) of the left controller 3 and the right controller 4 always coincide with the left-right directions about the directions of the gravitational accelerations, the degree of coincidence between the orientations is determined. Then, when the state where the difference between the orientations of the left controller 3 and the right controller 4 is within the predetermined range continues for a predetermined time, the determination based on the first condition is affirmative. When the difference between the orientations of the left controller 3 and the right controller 4 goes outside the predetermined range, the determination based on the first condition is immediately negative.

Further, the determination based on the second condition is made as follows. Angular velocities about axes (e.g., the xyz axes) acting on the left controller 3 and the right controller 4 are accumulated to calculate the directions of the respective axes. When the difference between the amounts of change in the axial directions is within a predetermined range, the determination is affirmative. Here, the amounts of change in the axial directions conceptually represent the angular velocities about the axes. Thus, the determination based on the second condition can also be considered as a determination in which, when the difference between the angular velocities is within a predetermined range, the determination is affirmative. It should be noted that in the exemplary embodiment, the second condition is determined using the difference between the amounts of change in the longitudinal directions (the y-axis directions) and the difference between the amounts of change in the left-right directions (the x-axis directions) in the xyz axes defined in the left controller 3 and the right controller 4. Then, when the state where the difference between the amounts of change in the axial directions of the left controller 3 and the right controller 4 is within the predetermined range continues for a predetermined time, the determination based on the second condition is affirmative. When the state where the difference between the amounts of change in the axial directions of the left controller 3 and the right controller 4 is outside the predetermined range continues for a predetermined time, the determination based on the second condition is negative.

It should be noted that in the first example where the operation method used by the user is determined, an operation using the two-hand-held operation method or the extension grip operation method is determined depending on a case where both the first condition and the second condition are satisfied, and a case where at least one of the first condition and the second condition is satisfied. The operation method is determined thus using two conditions, whereby it is possible to accurately determine various operations. For example, when one of the controllers is moved to rotate about the gravitational acceleration, both controllers may enter the state where the orientations of the controllers coincide with each other, and the determination based on the first condition may be affirmative. However, the determination based on the second condition is always negative. That is, in the determination using only the first condition, it may be erroneously determined that the operation method is an operation using the extension grip operation method. However, the determination based on the second condition is also made, whereby it is possible to accurately determine that the operation method is the two-hand-held operation method even in the above state. Further, even when an operation is performed using the two-hand-held operation method, and in the state where both controllers make the same motion, the determination based on the second condition may be affirmative. However, if the orientations of the controllers do not coincide with each other, the determination based on the first condition is always negative. That is, in the determination using only the second condition, it may be erroneously determined that the operation method is an operation using the extension grip operation method. However, the determination based on the first condition is also made, whereby it is possible to accurately determine that the operation method is the two-hand-held operation method even in the above state. If such effects are not desired, the operation method used by the user may be determined using one of the first condition and the second condition. Further, the operation method used by the user may be determined by adding another condition described later to the first condition and the second condition.

As a second example of the determination of the operation method used by the user, the main body apparatus 2 makes the determination based on whether or not a third condition that the difference between the value of data based on the detection result of the motion/orientation sensor included in the left controller 3 (e.g., the value of angular velocity data detected by the angular velocity sensor 105) and the value of data based on the detection result of the motion/orientation sensor included in the right controller 4 (e.g., the value of angular velocity data detected by the angular velocity sensor 115) is within a predetermined range is satisfied. Then, when the determination using the third condition is affirmative, it is determined that the user is performing an operation using the extension grip operation method. When the determination using the third condition is negative, it is determined that the user is performing an operation using the two-hand-held operation method. Then, when the state where the difference between the values of the above data output from the left controller 3 and the right controller 4 is within the predetermined range continues for a predetermined time, the determination based on the third condition is affirmative. When the state where the difference between the values of the above data output from the left controller 3 and the right controller 4 is outside the predetermined range continues for a predetermined time, the determination based on the third condition is negative.

It should be noted that the first example and the second example of the determination of the operation method are mere examples of the determination of the operation method based on the motions and/or the orientations of the left controller 3 and the right controller 4. Alternatively, the operation method may be determined using another parameter. As a third example, the process of determining the operation method may be performed only in a case where the left controller 3 and the right controller 4 are moving (i.e., by eliminating a case where the left controller 3 and the right controller 4 remain still). In this case, in the state where the left controller 3 and the right controller 4 are moving, and when the difference between the values of angular velocities generated in the controllers is within a predetermined range, it is possible to determine that the user is performing an operation using the extension grip operation method. In the state where the left controller 3 and the right controller 4 are moving, and when the difference between the values of angular velocities generated in the controllers is outside the predetermined range, it is possible to determine that the user is performing an operation using the two-hand-held operation method.

As a fourth example, the process of determining the operation method may be performed using the values of accelerations generated in the left controller 3 and the right controller 4. In this case, in accordance with the directions of the gravitational accelerations generated in the left controller 3 and the right controller 4, or the directions of accelerations generated in accordance with the motions of the left controller 3 and/or the right controller 4, when the left controller 3 and the right controller 4 are in the same orientation and/or are making the same motion, it is possible to determine that the user is performing an operation using the extension grip operation method. When the left controller 3 and the right controller 4 are in different orientations and/or are making different motions, it is possible to determine that the user is performing an operation using the two-hand-held operation method.

As a fifth example, the process of determining the operation method may be performed based on data based on the motion and/or the orientation of the left controller 3 detected by another motion/orientation sensor for detecting at least one of the motion and the orientation of the left controller 3, and data based on the motion and/or the orientation of the right controller 4 detected by another motion/orientation sensor for detecting at least one of the motion and the orientation of the right controller 4. As another motion/orientation sensor, it is possible to use a magnetic sensor for detecting the direction of magnetism generated in the controller, an image capturing apparatus for capturing a predetermined direction from the controller, or the like. In this case, in accordance with the directions of magnetism generated in the left controller 3 and the right controller 4, or the image capturing directions of the left controller 3 and/or the right controller 4, when the left controller 3 and the right controller 4 are in the same orientation and/or are making the same motion, it is possible to determine that the user is performing an operation using the extension grip operation method. When the left controller 3 and the right controller 4 are in different orientations and/or are making different motions, it is possible to determine that the user is performing an operation using the two-hand-held operation method.

Further, in the process of determining the operation method, when the left controller 3 and/or the right controller 4 are making predetermined motions or are in predetermined orientations, the determination may not be made, and the result of the determination of the operation method in the past set at this time may be maintained. For example, when an operation is performed in the above game, and when it is estimated that the motions or the orientations are the motions or the orientations of the controllers frequently used in an operation using the two-hand-held operation method, the process of changing the operation method from the two-hand-held operation method to the extension grip operation method (e.g., the process of determining the operation method) may not be performed. Further, when an operation is performed in the above game, and when it is estimated that the motions or the orientations are the motions or the orientations of the controllers frequently used in an operation using the extension grip operation method, the process of changing the operation method from the extension grip operation method to the two-hand-held operation method (e.g., the process of determining the operation method) may not be performed. As an example, in the above exemplary game, the operation of swinging and moving the left controller 3 and/or the right controller 4 is frequently used in an operation using the two-hand-held operation method. Thus, when accelerations exceeding a threshold are generated in the left controller 3 and/or the right controller 4, the process of determining the operation method may not be performed. Further, in the above exemplary game, the operation of setting the longitudinal directions of the left controller 3 and/or the right controller 4 to the vertical direction (i.e., the operation in which the negative y-axis directions are directed in the vertical direction) is frequently used in an operation using the two-hand-held operation method. Thus, when the negative y-axis directions of the left controller 3 and/or the right controller 4 are directed near the vertical direction, the process of determining the operation method may not be performed.

Figure 18:
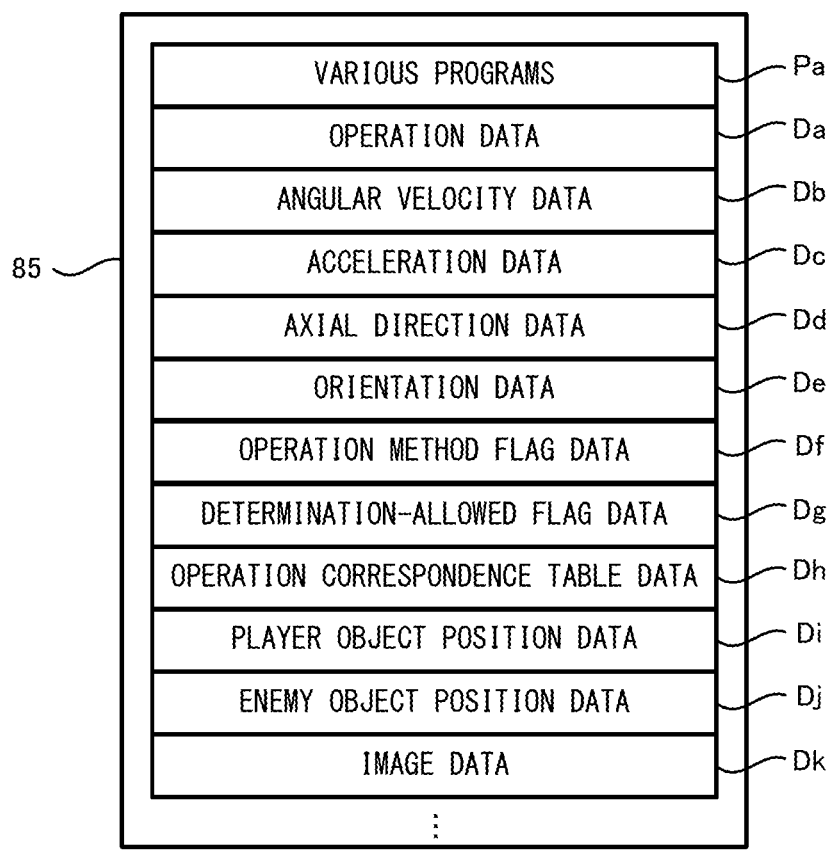
FIG. 18 is a diagram showing a non-limiting example of a data area set in a DRAM 85 of the main body apparatus 2.

Next, with reference to FIGS. 18 to 23, a description is given of an example of specific processing executed by the game system 1 according to the exemplary embodiment. FIG. 18 is a diagram showing an example of a data area set in the DRAM 85 of the main body apparatus 2 according to the exemplary embodiment. It should be noted that in the DRAM 85, in addition to data shown in FIG. 18, data used for other processes is also stored, but is not described in detail here.

In a program storage area of the DRAM 85, various programs Pa, which are executed by the game system 1, are stored. In the exemplary embodiment, as the various programs Pa, a communication program for wirelessly communicating with the left controller 3 and the right controller 4, an application program for performing information processing (e.g., game processing) based on data acquired from the left controller 3 and/or the right controller 4, a determination program for determining an operation method using the left controller 3 and/or the right controller 4, and the like are stored. It should be noted that the various programs Pa may be stored in advance in the flash memory 84, or may be acquired from a storage medium attachable to and detachable from the game system 1 (e.g., the predetermined type of storage medium attached to the slot 23) and stored in the DRAM 85, or may be acquired from another apparatus via a network such as the Internet and stored in the DRAM 85. The CPU 81 executes the various programs Pa stored in the DRAM 85.

In a data storage area of the DRAM 85, various data used for processes such as a communication process, information processing, and the like executed by the game system 1 is stored. In the exemplary embodiment, in the DRAM 85, operation data Da, angular velocity data Db, acceleration data Dc, axial direction data Dd, orientation data De, operation method flag data Df, determination-allowed flag data Dg, operation correspondence table data Dh, player object position data Di, enemy object position data Dj, image data Dk, and the like are stored.

The operation data Da is operation data appropriately acquired from each of the left controller 3 and/or the right controller 4. As described above, operation data transmitted from each of the left controller 3 and/or the right controller 4 includes information regarding an input (specifically, information regarding an operation or the detection result of each sensor) from each input section (specifically, each button, an analog stick, and each sensor). In the exemplary embodiment, operation data is transmitted from each of the left controller 3 and/or the right controller 4 in a predetermined cycle through wireless communication, and the operation data Da is appropriately updated using the received operation data. It should be noted that the update cycle of the operation data Dc may be such that the operation data Da is updated every frame, which is the cycle of the processing described later performed by the game system 1, or is updated every cycle in which operation data is transmitted through the above wireless communication.

The angular velocity data Db is data indicating angular velocities generated in each of the left controller 3 and the right controller 4. For example, the angular velocity data Db includes data indicating angular velocities about the xyz axes generated in each of the left controller 3 and the right controller 4 and the like.

The acceleration data Dc is data indicating accelerations generated in each of the left controller 3 and the right controller 4. For example, the acceleration data Dc includes data indicating accelerations generated in the xyz-axis directions except for the gravitational acceleration generated in each of the left controller 3 and the right controller 4 and the like.

The axial direction data Dd is data indicating the axial directions of each of the left controller 3 and the right controller 4. For example, the axial direction data Dd includes data indicating the xyz-axis directions obtained by accumulating angular velocities about the xyz axes of each of the left controller 3 and the right controller 4 and the like.

The orientation data De is data indicating each of the orientations of the left controller 3 and the right controller 4 with respect to the direction of a gravitational acceleration in real space. For example, the orientation data De includes data indicating the direction of a gravitational acceleration acting on each of the left controller 3 and the right controller 4, data indicating xyz-axis directions relative to the direction of the gravitational acceleration, and the like.

The operation method flag data Df is data indicating an operation method flag indicating an operation method (e.g., the two-hand-held operation method or the extension grip operation method) determined and set, and is set to on when the extension grip operation method is set.

The determination-allowed flag data Dg is data indicating a determination-allowed flag, which is set to on when the process of determining the operation method can be performed.

The operation correspondence table data Dh is data indicating the operation correspondence table (see FIG. 17) in which the contents of instructions to be given corresponding to operations are described with respect to each operation method.

The player object position data Di is data indicating each of the positions and the directions (the moving directions) in the virtual space of the first object G1, the second object G2, and the player object PO. The enemy object position data Dj is data indicating the position and the direction in the virtual space of the enemy object EO and data indicating the positions and the directions in the virtual space of objects shot from the enemy object EO (e.g., objects representing the left glove (the left fist) and the right glove (the right fist)).

The image data Dk is data for displaying an image (e.g., an image of a virtual object, a field image, or a background image) on the display 12 of the main body apparatus 2 or the display screen of the stationary monitor 6 when a game is performed.

Figure 19:
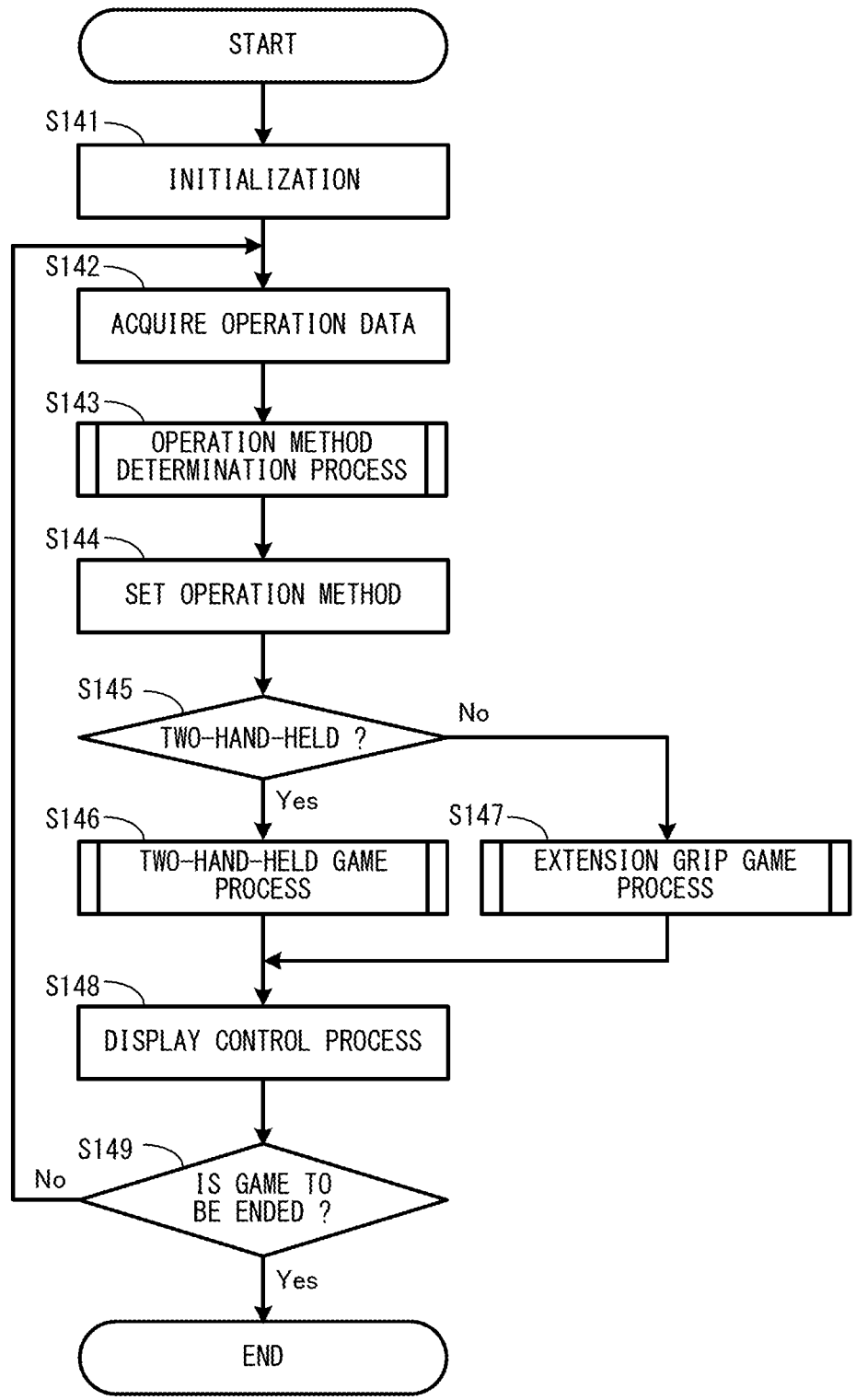
FIG. 19 is a flow chart showing a non-limiting example of game processing executed by the game system 1.
Figure 20:
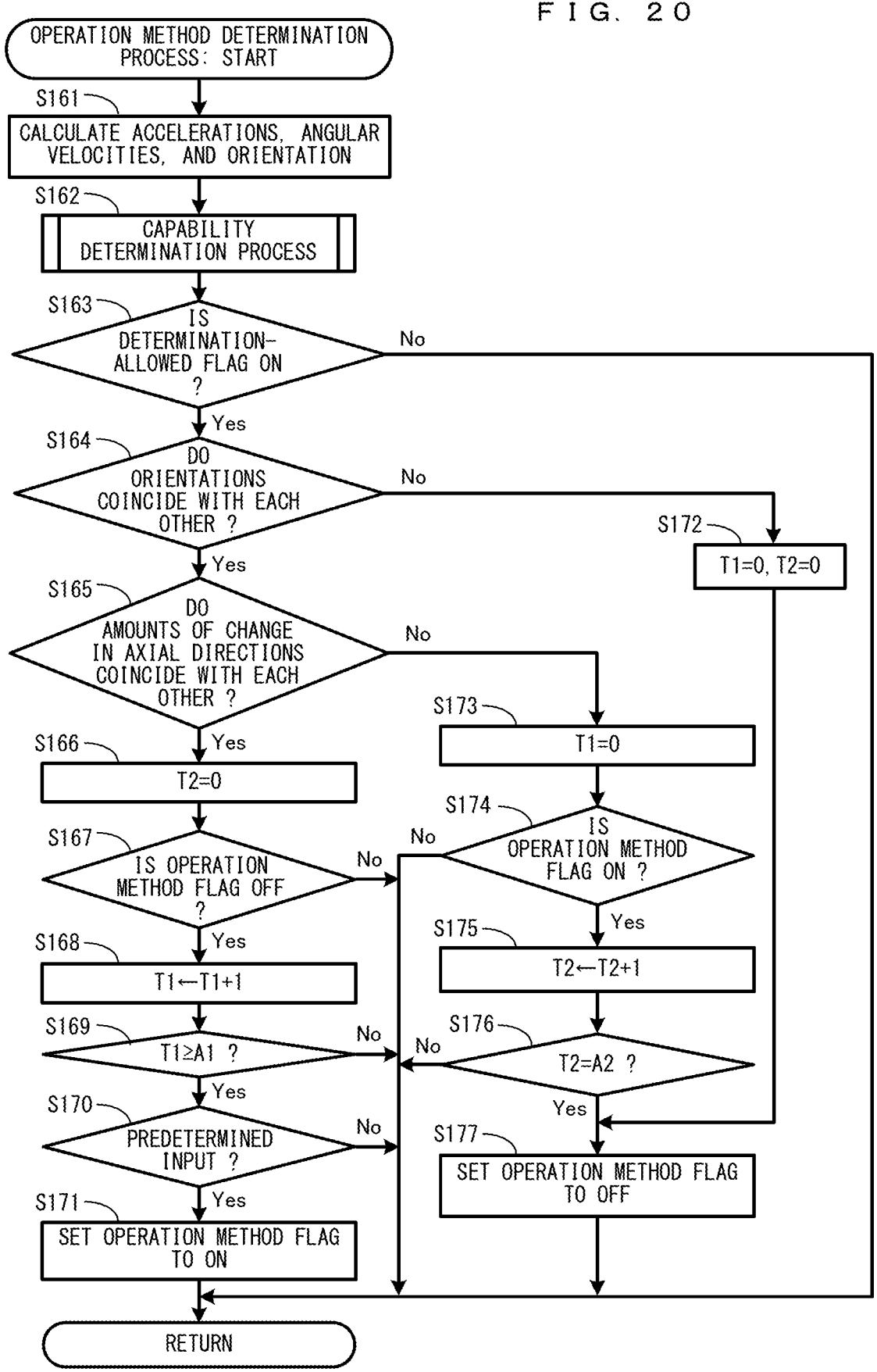
FIG. 20 is a subroutine showing a non-limiting example of the details of an operation method determination process performed in step S143 in FIG. 19.
Figure 21:
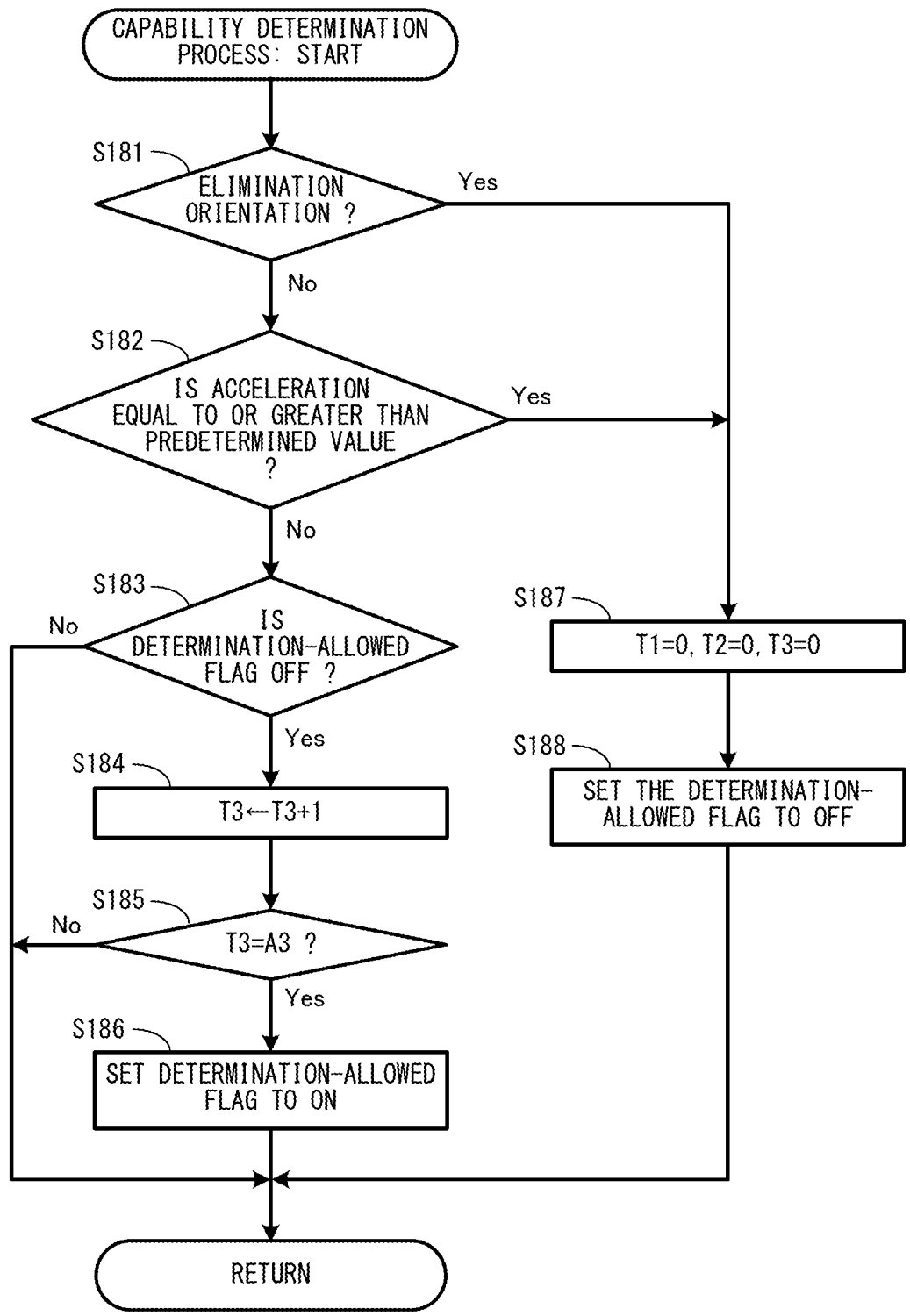
FIG. 21 is a subroutine showing a non-limiting example of the details of a capability determination process performed in step S162 in FIG. 20.
Figure 22:
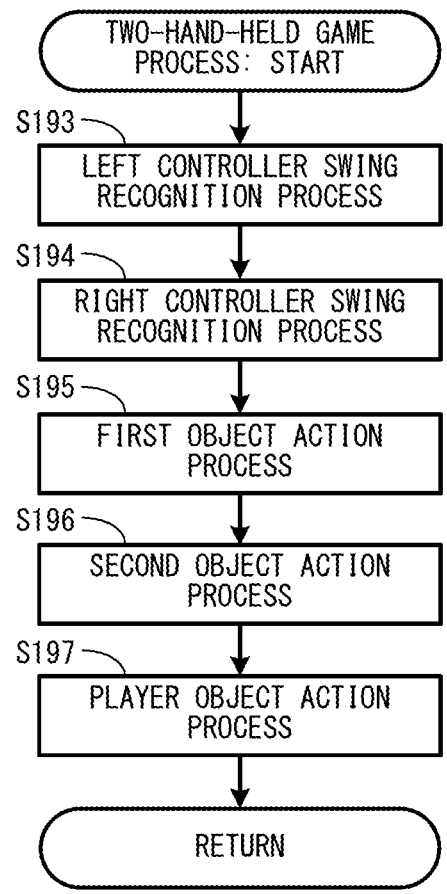
FIG. 22 is a subroutine showing a non-limiting example of the details of a two-hand-held game process performed in step S146 in FIG. 19.
Figure 23:
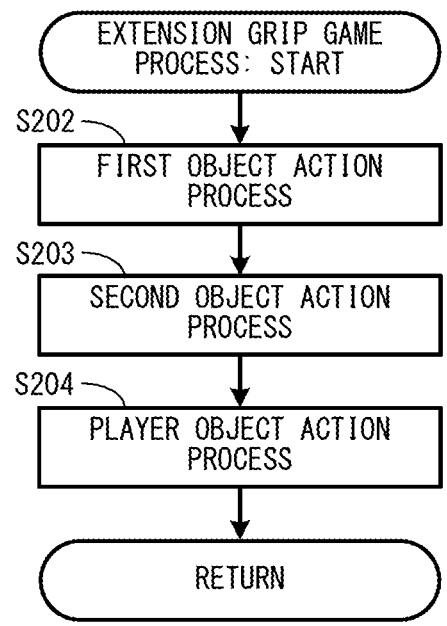
FIG. 23 is a subroutine showing a non-limiting example of the details of an extension grip game process performed in step S147 in FIG. 19.

Next, with reference to FIGS. 19 to 23, a detailed example of information processing (game processing) according to the exemplary embodiment is described. FIG. 19 is a flow chart showing an example of game processing executed by the game system 1. FIG. 20 is a subroutine showing an example of the details of an operation method determination process performed in step S143 in FIG. 19. FIG. 21 is a subroutine showing an example of the details of a capability determination process performed in step S162 in FIG. 20. FIG. 22 is a subroutine showing an example of the details of a two-hand-held game process performed in step S146 in FIG. 19. FIG. 23 is a subroutine showing an example of the details of an extension grip game process performed in step S147 in FIG. 19. In the exemplary embodiment, a series of processes shown in FIGS. 19 to 23 is performed by the CPU 81 executing the communication program and a predetermined application program (a game program) included in the various programs Pa. Further, the game processing shown in FIGS. 19 to 23 is started at any timing.

It should be noted that the processes of all of the steps in the flow charts shown in FIGS. 19 to 23 are merely illustrative. Thus, the processing order of the steps may be changed, or another process may be performed in addition to (or instead of) the processes of all of the steps, so long as similar results are obtained. Further, in the exemplary embodiment, descriptions are given on the assumption that the CPU 81 performs the processes of all of the steps in the flow charts. Alternatively, a processor or a dedicated circuit other than the CPU 81 may perform the processes of some of the steps in the flow charts. Yet alternatively, part of the processing performed by the main body apparatus 2 may be executed by another information processing apparatus capable of communicating with the main body apparatus 2 (e.g., a server capable of communicating with the main body apparatus 2 via a network). That is, all the processes shown in FIGS. 19 to 23 may be executed by the cooperation of a plurality of information processing apparatuses including the main body apparatus 2.

In FIG. 19, the CPU 81 performs initialization in the game processing (step S141), and the processing proceeds to the next step. For example, in the initialization, the CPU 81 initializes parameters for performing the processing described below. Further, in the initialization, the CPU 81 sets a game field for performing game play and sets the initial positions of the player object PO and the enemy object EO on the game field, thereby updating the player object position data Di and the enemy object position data Dj. Further, the CPU 81 initializes the moving directions of the first object G1 and the second object G2 to default values (e.g., front directions), thereby updating the player object position data Di.

Next, the CPU 81 acquires operation data from the left controller 3 and/or the right controller 4 and updates the operation data Da (step S142), and the processing proceeds to the next step.

Next, the CPU 81 performs an operation method determination process (step S143), and the processing proceeds to the next step. With reference to FIG. 20, the operation method determination process is described below.

Next, the CPU 81 calculates the accelerations, the angular velocities, and the orientation of each of the left controller 3 and the right controller 4 (step S161), and the processing proceeds to the next step.

For example, in the above step S161, the CPU 81 acquires data indicating accelerations generated in each of the left controller 3 and the right controller 4 from the operation data Da, removes a gravitational acceleration component from accelerations about the xyz-axis directions generated in each of the left controller 3 and the right controller 4, and updates the acceleration data Dc using data indicating the accelerations after the removal. As a method for extracting a gravitational acceleration, any method may be used. For example, an acceleration component generated on average in each of the left controller 3 and the right controller 4 may be calculated and extracted as a gravitational acceleration.

Further, in the above step S161, the CPU 81 accumulates angular velocities generated in each of the left controller 3 and the right controller 4, thereby calculating the axial directions of each of the left controller 3 and the right controller 4. Then, the CPU 81 updates the axial direction data Dd using data indicating the axial directions. The CPU 81 acquires, from the operation data Da, data indicating angular velocities generated in each of the left controller 3 and the right controller 4, calculates angular velocities about the xyz axes of each of the left controller 3 and the right controller 4, and accumulates the angular velocities, thereby calculating the xyz-axis directions of each of the left controller 3 and the right controller 4. It should be noted that as will be apparent later, the CPU 81 also maintains axial direction data calculated in the previous process to calculate the amounts of change in the xyz-axis directions.

Further, in the above step S161, the CPU 81 calculates, as the orientation of the left controller 3, the xyz-axis directions of the left controller 3 with respect to the direction of the gravitational acceleration calculated for the left controller 3 and updates the orientation data De using data indicating the orientation. Further, the CPU 81 calculates, as the orientation of the right controller 4, the xyz-axis directions of the right controller 4 with respect to the direction of the gravitational acceleration calculated for the right controller 4 and updates the orientation data De using data indicating the orientation. Here, the CPU 81 corrects the above orientation so that predetermined axial directions (e.g., the positive x-axis directions) of the left controller 3 and the right controller 4 about the direction of the gravitational acceleration coincide with each other, thereby updating the orientation data De. Specifically, the CPU 81 calculates horizontal direction components of the positive x-axis directions of the left controller 3 and the right controller 4 and corrects one of the orientations of the left controller 3 and the right controller 4 by rotating the orientation about the direction of the gravitational acceleration so that the directions of the horizontal direction components coincide with each other.

It should be noted that after the xyz-axis directions with respect to the gravitational acceleration are calculated, the orientation of the left controller 3 or the right controller 4 may be updated in accordance with only the angular velocities about the xyz axes. However, to prevent the relationship between the orientation of the left controller 3 or the right controller 4 and the direction of the gravitational acceleration from shifting due to erroneous accumulation, the xyz-axis directions relative to the direction of the gravitational acceleration may be calculated and the above correction is made every predetermined cycle, and the orientation of the left controller 3 or the right controller 4 may be corrected.

Next, the CPU 81 performs a capability determination process (step S162), and the processing proceeds to the next step. With reference to FIG. 21, the capability determination process is described below.

In FIG. 21, the CPU 81 determines whether or not the orientations are an elimination orientation for eliminating the performance of the operation method determination process (step S181). For example, with reference to the orientation data De, the CPU 81 acquires the orientations of the left controller 3 and the right controller 4 and determines whether or not the orientations are included in the elimination orientation. Specifically, when the orientations in which the longitudinal directions of the left controller 3 and/or the right controller 4 are the vertical direction (i.e., the orientation in which the negative y-axis directions are directed in the vertical direction) are set to the elimination orientation, the CPU 81 performs the determination process in the above step S181 based on whether or not the negative y-axis directions indicated by the orientation data De are included in a range recognized as the elimination orientation. Then, when the orientations are not the elimination orientation, the processing proceeds to step S182. On the other hand, when the orientations are the elimination orientation, the processing proceeds to step S187.

In step S182, the CPU 81 determines whether or not an acceleration generated in the left controller 3 or the right controller 4 is equal to or greater than a predetermined value. For example, with reference to the acceleration data Dc, the CPU 81 acquires the magnitudes of accelerations generated in the left controller 3 and the right controller 4. When at least one of the magnitudes of the accelerations is greater than the predetermined value, the determination is affirmative in the above step S182. Here, for example, the predetermined value is set to a threshold that, when the user moves the left controller 3 and/or the right controller 4, allows the determination of the accelerations generated in the left controller 3 and/or the right controller 4. Then, when both the accelerations generated in the left controller 3 and the right controller 4 are less than the predetermined value, the processing proceeds to step S183. On the other hand, when at least one of the accelerations generated in the left controller 3 and the right controller 4 is equal to or greater than the predetermined value, the processing proceeds to step S187.

In step S183, the CPU 81 determines whether or not the determination-allowed flag is set to off. For example, with reference to the determination-allowed flag data Dg, the CPU 81 determines whether or not the determination-allowed flag is set to off. Then, when the determination-allowed flag is set to off, the processing proceeds to step S184. On the other hand, when the determination-allowed flag is set to on, the processing of this subroutine ends.

In step S184, the CPU 81 adds 1 to a temporary variable T3, and the processing proceeds to the next step. Here, the temporary variable T3 is a parameter indicating a stability time of the left controller 3 and the right controller 4 for performing the operation method determination process. Every time the above step S184 is executed, 1 is added to the temporary variable T3, thereby measuring the stability time.

Next, the CPU 81 determines whether or not the temporary variable T3 reaches a threshold A3 (step S185). Here, the threshold A3 is a value indicating a time (e.g., 20 frames) for determining that the left controller 3 and the right controller 4 are both in stable states, and is set to A3=20, for example. Then, when the temporary variable T3 reaches the threshold A3, the processing proceeds to step S186. On the other hand, when the temporary variable T3 does not reach the threshold A3, the processing of this subroutine ends.

In step S186, the CPU 81 sets the determination-allowed flag to on, and the processing of this subroutine ends. For example, the CPU 81 sets the determination-allowed flag to on, thereby updating the determination-allowed flag data Dg. As described above, when the state where the orientations are not the elimination orientation (the determination is negative in step S181), and the left controller 3 and the right controller 4 are stable (the determination is negative in step S182) continues for a predetermined time (the determination is affirmative in step S185), the CPU 81 sets the determination-allowed flag to on so that the operation method determination process can be executed.

On the other hand, when the left controller 3 or the right controller 4 is in the elimination orientation (the determination is affirmative in step S181), or when at least one of the accelerations generated in the left controller 3 and the right controller 4 is equal to or greater than the predetermined value (the determination is affirmative in step S182), the CPU 81 initializes all temporary variables T1, T2, and T3 to 0 (step S187), and the processing proceeds to the next step. Here, as will be apparent later, the temporary variable T1 is a parameter indicating the time in which the difference between the amounts of change in the axial directions is within a predetermined range. The temporary variable T2 is a parameter indicating the time in which the difference between the amounts of change is outside the predetermined range.

Next, the CPU 81 sets the determination-allowed flag to off, and the processing of this subroutine ends. For example, the CPU 81 sets the determination-allowed flag to off, thereby updating the determination-allowed flag data Dg. As described above, when the orientations are the elimination orientation (the determination is affirmative in step S181), or when the left controller 3 and the right controller 4 are not stable (the determination is affirmative in step S182), the CPU 81 sets the determination-allowed flag to off so that the operation method determination process cannot be executed.

Referring back to FIG. 20, after the capability determination process in the above step S162, the CPU 81 determines whether or not the determination-allowed flag is set to on (step S163). Then, when the determination-allowed flag is set to on, the processing proceeds to step S164. On the other hand, when the determination-allowed flag is set to off, the processing of this subroutine ends without the CPU 81 performing an operation method determination process described later.

In step S164, the CPU 81 determines whether or not the orientation of the left controller 3 and the orientation of the right controller 4 coincide with each other. Then, when the orientation of the left controller 3 and the orientation of the right controller 4 coincide with each other, the processing proceeds to step S165. On the other hand, when the orientation of the left controller 3 and the orientation of the right controller 4 do not coincide with each other, the processing proceeds to step S172. For example, with reference to the orientation data De, the CPU 81 acquires the orientations of the left controller 3 and the right controller 4. When the difference between the orientations is within a predetermined range, the determination is affirmative in the above step S164. Here, the predetermined range is an allowable amount of shift of each axial direction based on which it is determined that the orientation of the left controller 3 and the orientation of the right controller 4 coincide with each other in real space. In the exemplary embodiment, the degree of coincidence between two axes (e.g., the x-axis and the y-axis) in the xyz axes is determined. Thus, when both shifts in the x-axis directions of the controllers and shifts in the y-axis directions of the controllers in real space are within the predetermined range, the determination is affirmative in the above step S164.

In step S165, the CPU 81 determines whether or not the amounts of change in the axial directions coincide with each other. Then, when the amounts of change in the axial directions coincide with each other, the processing proceeds to step S166. On the other hand, when the amounts of change in the axial directions do not coincide with each other, the processing proceeds to step S173. For example, with reference to the axial direction data Dd, when the difference between the amount of change in the axial direction of the left controller 3 and the amount of change in the axial direction of the right controller 4 is within a predetermined range, the determination is affirmative in the above step S165. Specifically, CPU 81 compares the angular difference (the amount of change) between the positive x-axis direction of the left controller 3 set in the previous process and the positive x-axis direction of the left controller 3 set in the current process, with the angular difference (the amount of change) between the positive x-axis direction of the right controller 4 set in the previous process and the positive x-axis direction of the right controller 4 set in the current process. When the difference between the angular differences is within a predetermined range, it is determined that the amounts of change in the x-axis directions coincide with each other. Further, the CPU 81 compares the angular difference (the amount of change) between the positive y-axis direction of the left controller 3 set in the previous process and the positive y-axis direction of the left controller 3 set in the current process, with the angular difference (the amount of change) between the positive y-axis direction of the right controller 4 set in the previous process and the positive y-axis direction of the right controller 4 set in the current process. When the difference between the angular differences is within a predetermined range, it is determined that the amounts of change in the y-axis directions coincide with each other. Then, when it is determined that the amounts of change in the x-axis directions coincide with each other, and also the amounts of change in the y-axis directions coincide with each other, the determination is affirmative in the above step S165.

In step S166, the CPU 81 initializes the temporary variable T2 to 0, and the processing proceeds to the next step.

Next, the CPU 81 determines whether or not the operation method flag is set to off (step S167). For example, with reference to the operation method flag data Df, the CPU 81 determines whether or not the operation method flag is set to off. Then, when the operation method flag is set to off, the processing proceeds to step S168. On the other hand, when the operation method flag is set to on, the processing of this subroutine ends.

In step S168, the CPU 81 adds 1 to the temporary variable T1, and the processing proceeds to the next step. Here, the temporary variable T1 is a parameter indicating the time in which the difference between the amounts of change in the axial directions is maintained within the predetermined range. Every time the above step S168 is executed, 1 is added to the temporary variable T1, thereby measuring the time.

Next, the CPU 81 determines whether or not the temporary variable T1 reaches the threshold A1 (step S169). Here, the threshold A1 is a value indicating a time for determining that the state where the difference between the amounts of change in the axial directions is within the predetermined range is continuously maintained for a predetermined time (e.g., 30 frames), and is set to A1=30, for example. Then, when the temporary variable T1 is equal to or greater than the threshold A, the processing proceeds to step S170. On the other hand, when the temporary variable T1 does not reach the threshold A1, the processing of this subroutine ends.

In step S170, the CPU 81 determines whether or not a predetermined input is provided. Then, when the predetermined input is provided, the processing proceeds to step S171. On the other hand, when the predetermined input is not provided, the processing of this subroutine ends. For example, with reference to the operation data Da, when the user performs any of operation inputs used in an operation method set when the operation method flag is set to on, i.e., in the extension grip operation method, the CPU 81 determines that the predetermined input is provided. As an example, in the case of the above exemplary game, when an operation input for tilting or pushing in the stick 32 or an operation input for pressing the A-button 53, the B-button 54, the X-button 55, or the Y-button 56 is provided, the CPU 81 determines that the predetermined input is provided.

In step S171, the CPU 81 sets the operation method flag to on, and the processing of this subroutine ends. For example, the CPU 81 sets the operation method flag to on, thereby updating the operation method flag data Df. As described above, the time (the temporary variable T1) in which the orientations of the left controller 3 and the right controller 4 coincide with each other (the determination is affirmative in step S164), and the amounts of change in the axial directions coincide with each other (the determination is affirmative in step S165) continues for the predetermined time (the threshold A1) (the determination is affirmative in step S169), the CPU 81 switches the operation method to the extension grip operation method using the provision of the predetermined input as a trigger (sets the operation method flag to on in step S171).

On the other hand, when it is determined in the above step S164 that the orientations of the left controller 3 and the orientation of the right controller 4 do not coincide with each other, the CPU 81 initializes the temporary variables T1 and T2 to 0 (step S172), and the processing proceeds to step S177.

Further, when it is determined in the above step S165 that the amounts of change in the axial directions do not coincide with each other, the CPU 81 initializes the temporary variable T1 to 0 (step S173), and the processing proceeds to the next step.

Next, the CPU 81 determines whether or not the operation method flag is set to on (step S174). For example, with reference to the operation method flag data Df, the CPU 81 determines whether or not the operation method flag is set to on. Then, when the operation method flag is set to on, the processing proceeds to step S175. On the other hand, when the operation method flag is set to off, the processing of this subroutine ends.

In step S175, the CPU 81 adds 1 to the temporary variable T2, and the processing proceeds to the next step. Here, the temporary variable T2 is a parameter indicating the time in which the state where the difference between the amounts of change in the axial directions exceeds the predetermined range continues. Every time the above step S174 is executed, 1 is added to the temporary variable T2, thereby measuring the time.

Next, the CPU 81 determines whether or not the temporary variable T2 reaches the threshold A2 (step S176). Here, the threshold A2 is a value indicating a time for determining that the state where the difference between the amounts of change in the axial directions exceeds the predetermined range continues for a predetermined time (e.g., 5 frames), and is set to A2=5, for example. Then, when the temporary variable T2 reaches the threshold A2, the processing proceeds to step S177. On the other hand, when the temporary variable T2 does not reach the threshold A2, the processing of this subroutine ends.

In step S177, the CPU 81 sets the operation method flag to off, and the processing of this subroutine ends. For example, the CPU 81 sets the operation method flag to off, thereby updating the operation method flag data Df. As described above, when the orientations of the left controller 3 and the right controller 4 do not coincide with each other (the determination is negative in step S164), the CPU 81 immediately switches the operation method to the two-hand-held operation method (sets the operation method flag to off in step S177). Further, when the time (the temporary variable T2) in which the amounts of change in the axial directions do not coincide with each other (the determination is negative in step S165) continues for the predetermined time (the threshold A2) (the determination is affirmative in step S176), the CPU 81 switches the operation method to the two-hand-held operation method (sets the operation method flag to off in step S177).

Referring back to FIG. 19, after the operation method determination process in the above step S143, the CPU 81 sets the operation method (step S144), and the processing proceeds to the next step. For example, in accordance with the operation method flag indicated by the operation method flag data Df, the CPU 81 sets an operation mode for use in the game processing. For example, the operation mode for use in the game processing is set, whereby the CPU 81 makes a setting so that an operation method corresponding to the operation mode is selected and used based on the description content of the operation correspondence table data Dh in the subsequent game processing.

Next, the CPU 81 determines whether or not the two-hand-held operation method is selected (step S145). Then, when the two-hand-held operation method is selected, the processing proceeds to step S146. On the other hand, when the extension grip operation method is selected, the processing proceeds to step S147.

In step S146, the CPU 81 performs the game processing in a two-hand-held operation mode, and the processing proceeds to step S148. With reference to FIG. 22, a description is given below of the game processing in the two-hand-held operation mode.

In FIG. 22, the CPU 81 performs a left controller swing recognition process (step S193), and the processing proceeds to the next step. For example, with reference to the acceleration data Dc, when the magnitudes of xy accelerations generated in the left controller 3 at the current moment are greater than a threshold for a swing determination regarding the left controller 3, the CPU 81 determines that the left controller 3 is swung. Here, the xy accelerations are accelerations obtained by removing a z-axis direction component (i.e., a horizontal direction component of the left controller 3 in an operation by the two-hand-held operation method described with reference to FIGS. 8 to 13) from accelerations generated in the left controller 3.

Next, the CPU 81 performs a right controller swing recognition process (step S194), and the processing proceeds to the next step. For example, with reference to the acceleration data Dc, when the magnitudes of xy accelerations generated in the right controller 4 at the current moment are greater than a threshold for a swing determination regarding the right controller 4, the CPU 81 determines that the right controller 4 is swung. Here, the xy accelerations are accelerations obtained by removing a z-axis direction component (i.e., a horizontal direction component of the right controller 4 in an operation by the two-hand-held operation method described with reference to FIGS. 8 to 13) from accelerations generated in the right controller 4.

Next, the CPU 81 performs a first object action process (step S195), and the processing proceeds to the next step. For example, in accordance with the determination in the above step S163 that the left controller 3 is swung, the CPU 81 starts the movement of the first object G1 from the movement start position. Then, in accordance with the tilt in the z-axis direction of the left controller 3 relative to the direction of the gravitational acceleration, the CPU 81 changes the moving direction of the first object G1. Specifically, the CPU 81 acquires the orientation of the left controller 3 with reference to the orientation data De and calculates the tilt in the z-axis direction of the left controller 3 relative to the direction of the gravitational acceleration. Further, in accordance with the angular velocity of the left controller 3 about the direction of the gravitational acceleration, the CPU 81 changes the moving direction of the first object G1. Specifically, with reference to the angular velocity data Db, the CPU 81 acquires angular velocities about the xyz axes generated in the left controller 3, and based on the acquired angular velocities, the CPU 81 calculates the angular velocity of the left controller 3 about the direction of the gravitational acceleration. Then, based on the moving direction and the movement algorithm of the first object G1, the CPU 81 continues the movement of the first object G1 until the first object G1 returns to the movement start position. For example, with reference to the player object position data Di, the CPU 81 acquires the position and the moving direction of the first object G1, and based on the moving direction and the movement algorithm, the CPU 81 causes the first object G1 to move from the acquired position of the first object G1. Then, the CPU 81 updates the player object position data Di using the position of the first object G1 after the movement. It should be noted that when the first object G1 is moving on a homeward path in the virtual space for returning to the movement start position, the CPU 81 may fixedly set the moving direction to the direction in which the first object G1 returns from the current position of the first object G1 to the movement start position. Further, when the first object G1 collides with another object, the position of the first object G1 is set to a position corresponding to this collision state. Further, when the player object PO does not perform the action of throwing a left punch, the position of the first object G1 is set to a movement start position based on the position of the player object PO.

Next, the CPU 81 performs a second object action process (step S196), and the processing proceeds to the next step. For example, in accordance with the determination in the above step S194 that the right controller 4 is swung, the CPU 81 starts the movement of the second object G2 from the movement start position. Then, in accordance with the tilt in the z-axis direction of the right controller 4 relative to the direction of the gravitational acceleration, the CPU 81 changes the moving direction of the second object G2. Specifically, the CPU 81 acquires the orientation of the right controller 4 with reference to the orientation data De and calculates the tilt in the z-axis direction of the right controller 4 relative to the direction of the gravitational acceleration. Further, in accordance with the angular velocity of the right controller 4 about the direction of the gravitational acceleration, the CPU 81 changes the moving direction of the second object G2. Specifically, with reference to the angular velocity data Db, the CPU 81 acquires angular velocities about the xyz axes generated in the right controller 4, and based on the angular velocities, the CPU 81 calculates the angular velocity of the right controller 4 about the direction of the gravitational acceleration. Then, based on the moving direction and the movement algorithm of the second object G2, the CPU 81 continues the movement of the second object G2 until the second object G2 returns to the movement start position. For example, with reference to the player object position data Di, the CPU 81 acquires the position and the moving direction of the second object G2, and based on the moving direction and the movement algorithm, the CPU 81 causes the second object G2 to move from the acquired position of the second object G2. Then, the CPU 81 updates the player object position data Di using the position of the second object G2 after the movement. It should be noted that when the second object G2 is moving on a homeward path in the virtual space for returning to the movement start position, the CPU 81 may fixedly set the moving direction to the direction in which the second object G2 returns from the current position of the second object G2 to the movement start position. Further, when the second object G2 collides with another object, the position of the second object G2 is set to a position corresponding to this collision state. Further, when the player object PO does not perform the action of throwing a right punch, the position of the second object G2 is set to a movement start position based on the position of the player object PO.

Next, the CPU 81 performs a player object action process (step S197), and the processing of this subroutine ends. For example, based on a description content corresponding to the two-hand-held operation mode in the operation correspondence table indicated by the operation correspondence table data Dh, the CPU 81 sets the content of an instruction indicated by the operation data acquired in the above step S142, and in accordance with the set content of the instruction, the CPU 81 causes the player object PO to perform an action, thereby updating the player object position data Di. That is, with reference to the orientation data De, when both the left controller 3 and the right controller 4 are tilted to the left, the CPU 81 causes the player object PO to move to the left at a moving velocity corresponding to the tilt angle, thereby updating the player object position data Di. With reference to the orientation data De, when both the left controller 3 and the right controller 4 are tilted to the right, the CPU 81 causes the player object PO to move to the right at a moving velocity corresponding to the tilt angle, thereby updating the player object position data Di. With reference to the orientation data De, when both the left controller 3 and the right controller 4 are tilted forward, the CPU 81 causes the player object PO to move forward at a moving velocity corresponding to the tilt angle, thereby updating the player object position data Di. With reference to the orientation data De, when both the left controller 3 and the right controller 4 are tilted backward, the CPU 81 causes the player object PO to move backward at a moving velocity corresponding to the tilt angle, thereby updating the player object position data Di. Then, with reference to the orientation data De, when both the left controller 3 and the right controller 4 are tilted inward, and if the first object G1 and the second object G2 are placed at the movement start positions, the CPU 81 causes the player object PO to perform a defense action. Further, with reference to the operation data Da, when the first L-button 38 is pressed, the CPU 81 causes the player object PO to move dashing, thereby updating the player object position data Di. Further, with reference to the operation data Da, when the first R-button 60 is pressed, the CPU 81 causes the player object PO to jump, thereby updating the player object position data Di.

Referring back to FIG. 19, when it is determined in the above step S145 that the two-hand-held operation method is not selected, the CPU 81 performs the game processing in an extension grip operation mode (step S147), and the processing proceeds to step S148. With reference to FIG. 23, the game processing in the extension grip operation mode is described below.

In FIG. 23, the CPU 81 performs a first object action process (step S202), and the processing proceeds to the next step. For example, based on a description content corresponding to the extension grip operation mode in the operation correspondence table indicated by the operation correspondence table data Dh, the CPU 81 sets the content of an instruction indicated by the operation data acquired in the above step S142, and in accordance with the set content of the instruction, the CPU 81 causes the first object G1 to perform an action, thereby updating the player object position data Di.

For example, when the operation data acquired in the above step S142 indicates a pressing operation on the B-button 54, the CPU 81 starts the movement of the first object G1 from the movement start position in a predetermined direction, thereby updating the player object position data Di. Further, when the operation data acquired in the above step S142 indicates a tilt operation on the analog stick 32, and if the first object G1 is moving away from the movement start position in the virtual game world, then in accordance with the direction in which the analog stick 32 is subjected to the tilt operation and the tilt angle, the CPU 81 changes the moving direction or the moving velocity of the first object G1, thereby updating the player object position data Di. Then, based on the moving direction and the movement algorithm of the first object G1, the CPU 81 continues the movement of the first object G1 until the first object G1 returns to the movement start position. For example, with reference to the player object position data Di, the CPU 81 acquires the position and the moving direction of the first object G1, and based on the moving direction and the movement algorithm, the CPU 81 causes the first object G1 to move from the acquired position of the first object G1. Then, the CPU 81 updates the player object position data Di using the position of the first object G1 after the movement. It should be noted that when the first object G1 is moving on the homeward path in the virtual space for returning to the movement start position, the CPU 81 may fixedly set the moving direction to the direction in which the first object G1 returns from the current position of the first object G1 to the movement start position. Further, when the first object G1 collides with another object, the position of the first object G1 is set to a position corresponding to this collision state. Further, when the player object PO does not perform the action of throwing a left punch, the position of the first object G1 is set to a movement start position based on the position of the player object PO.

Next, the CPU 81 performs a second object action process (step S203), and the processing proceeds to the next step. For example, based on the description content corresponding to the extension grip operation mode in the operation correspondence table indicated by the operation correspondence table data Dh, the CPU 81 sets the content of an instruction indicated by the operation data acquired in the above step S142, and in accordance with the set content of the instruction, the CPU 81 causes the second object G2 to perform an action, thereby updating the player object position data Di.

For example, when the operation data acquired in the above step S142 indicates a pressing operation on the A-button 53, the CPU 81 starts the movement of the second object G2 from the movement start position in a predetermined direction, thereby updating the player object position data Di. Further, when the operation data acquired in the above step S142 indicates a tilt operation on the analog stick 32, and if the second object G2 is moving away from the movement start position in the virtual game world, then in accordance with the direction in which the analog stick 32 is subjected to the tilt operation and the tilt angle, the CPU 81 changes the moving direction or the moving velocity of the second object G2, thereby updating the player object position data Di. Then, based on the moving direction and the movement algorithm of the second object G2, the CPU 81 continues the movement of the second object G2 until the second object G2 returns to the movement start position. For example, with reference to the player object position data Di, the CPU 81 acquires the position and the moving direction of the second object G2, and based on the moving direction and the movement algorithm, the CPU 81 causes the second object G2 to move from the acquired position of the second object G2. Then, the CPU 81 updates the player object position data Di using the position of the second object G2 after the movement. It should be noted that when the second object G2 is moving on the homeward path in the virtual space for returning to the movement start position, the CPU 81 may fixedly set the moving direction to the direction in which the second object G2 returns from the current position of the second object G2 to the movement start position. Further, when the second object G2 collides with another object, the position of the second object G2 is set to a position corresponding to this collision state. Further, when the player object PO does not perform the action of throwing a right punch, the position of the second object G2 is set to a movement start position based on the position of the player object PO.

Next, the CPU 81 performs a player object action process (step S204), and the processing of this subroutine ends. For example, based on the description content corresponding to the extension grip operation mode in the operation correspondence table indicated by the operation correspondence table data Dh, the CPU 81 sets the content of an instruction indicated by the operation data acquired in the above step S142, and in accordance with the set content of the instruction, the CPU 81 causes the player object PO to perform an action, thereby updating the player object position data Di. That is, with reference to the operation data Da, when the analog stick 32 is subjected to a tilt operation in the positive x-axis direction, the CPU 81 causes the player object PO to move to the left at a moving velocity corresponding to the tilt angle, thereby updating the player object position data Di. With reference to the operation data Da, when the analog stick 32 is subjected to a tilt operation in the negative x-axis direction, the CPU 81 causes the player object PO to move to the right at a moving velocity corresponding to the tilt angle, thereby updating the player object position data Di. With reference to the operation data Da, when the analog stick 32 is subjected to a tilt operation in the positive y-axis direction, the CPU 81 causes the player object PO to move forward at a moving velocity corresponding to the tilt angle, thereby updating the player object position data Di. With reference to the operation data Da, when the analog stick 32 is subjected to a tilt operation in the negative y-axis direction, the CPU 81 causes the player object PO to move backward at a moving velocity corresponding to the tilt angle, thereby updating the player object position data Di. Then, with reference to the operation data Da, when the operation of pushing in the analog stick 32 is performed, and if the first object G1 and the second object G2 are placed at the movement start positions, the CPU 81 causes the player object PO to perform a defense action. Further, with reference to the operation data Da, when the Y-button 56 is pressed, the CPU 81 causes the player object PO to move dashing, thereby updating the player object position data Di. Further, with reference to the operation data Da, when the X-button 55 is pressed, the CPU 81 causes the player object PO to jump, thereby updating the player object position data Di.

Referring back to FIG. 19, in step S148, the CPU 81 performs a display control process, and the processing proceeds to the next step. For example, the CPU 81 places the player object PO, the first object G1, the second object G2, and the enemy object EO on the game field using the player object position data Di and the enemy object position data Dj. Then, the CPU 81 performs the process of generating a virtual space image in which the game field is viewed from a virtual camera placed at a predetermined position (e.g., behind the player object PO), and displaying the virtual space image on a display screen of a display device (e.g., the stationary monitor 6).

Next, the CPU 81 determines whether or not the game is to be ended (step S149). In the above step S149, examples of a condition for ending the game include: the fact that the result of the above game is settled; and the fact that the user performs the operation of ending the game. When the game is not to be ended, the processing returns to the above step S142, and the process of step S145 is repeated. When the game is to be ended, the processing of the flow chart ends. Hereinafter, the series of processes of steps S142 to S149 are repeatedly executed until it is determined in step S149 that the game is to be ended. It should be noted that as is clear from the series of processes of steps S142 to S149, which are repeatedly executed, the operation method determination process in the above step S143 is repeatedly executed even after the game is started. That is, in the exemplary embodiment, when the user changes the operation method during the game, it is possible to continue the game in a game mode based on the operation method after this change.

As described above, in the exemplary embodiment, when an operation is performed using both the left controller 3 and the right controller 4, it is possible to determine, based on the motion or the orientation of each controller, by what operation method (the two-hand-held operation method or the extension grip operation method) the operation is performed. Further, it is possible to determine the operation method based on the motions or the orientations of the left controller 3 and the right controller 4. Thus, even when the extension grip 350 is not electrically connected to the left controller 3 and the right controller 4, it is possible to determine whether or not the left controller 3 and the right controller 4 are attached to the extension grip 350.

It should be noted that in the above exemplary embodiment, the two-hand-held operation method switches to the extension grip operation method using a predetermined operation input as a trigger. When the extension grip operation method switches to the two-hand-held operation method, an operation input is not required. This may be appropriately set in accordance with an operation input used in each operation mode in accordance with the game content. Even when an operation input is not provided, the two-hand-held operation method may switch to the extension grip operation method. Alternatively, the extension grip operation method may switch to the two-hand-held operation method using a predetermined operation input as a trigger.

Further, in the above exemplary embodiment, using the difference between the amounts of change in the longitudinal directions (the y-axis directions) and the difference between the amounts of change in the left-right directions (the x-axis directions) in the xyz axes defined in the left controller 3 and the right controller 4, the difference between the amounts of change in the axial directions is determined. Alternatively, the amounts of change in other two axes may be used. Yet alternatively, when high determination accuracy is not required, then using only single axes in the xyz-axis directions defined in the left controller 3 and the right controller 4, the amount of change in the axial direction may be determined. In this case, the single axes used for the determination in the xyz axes may be selected based on the orientations or the motions of the left controller 3 and the right controller 4 frequently used in accordance with the game content.

Further, in the above exemplary embodiment, when the orientations of the left controller 3 and the right controller 4 are calculated, correction is always made by rotating one of the orientations of the left controller 3 and the right controller 4 about the direction of the gravitational acceleration so that the directions of horizontal direction components in the positive x-axis directions coincide with each other. This correction process, however, may not be performed. For example, when a predetermined condition is satisfied (e.g., when the left controller 3 and the right controller 4 are attached to the extension grip 350), the axial directions of the left controller 3 and the right controller 4 are caused to coincide with each other, and thereafter, the axial directions are changed in accordance with detected velocities. As described above, in the state where the relationships between the axial directions are fixed, the positional relationships between the axial directions are set, whereby not only is it possible to make a similar determination without performing the process of always making correction as described above, but it is also possible to make a determination taking into account the directions of the left controller 3 and the right controller 4 in the left-right directions.

Further, in the above exemplary embodiment, as an example of the attachment to which the left controller 3 and the right controller 4 are attachable, the extension grip 350 is used, to which the left controller 3 and the right controller 4 are attached in the same direction. Alternatively, the attachment of the left controller 3 and the right controller to an attachment to which the left controller 3 and the right controller 4 are attached in different directions may be determined. As an example, a gun-shaped attachment having a barrel portion to which one of the left controller 3 and the right controller 4 is attached, and a handle portion to which the other of the left controller 3 and the right controller 4 is attached may be used. In this case, one of the controllers is attached to the barrel portion so that the longitudinal direction of the controller is the bullet firing direction of the barrel portion, and the other controller is attached to the handle portion such that the left-right direction of the controller is held, whereby the left controller 3 and the right controller 4 are attached to the gun-shaped attachment in different directions. Even in such a gun-shaped attachment, the orientations of the left controller 3 and the right controller 4 when attached to the gun-shaped attachment are set in advance, and the above determination of the coincidence between the orientations is replaced with the determination of whether or not the left controller 3 and the right controller 4 are in the set orientations, whereby it is possible to determine, based on the motions or the orientations of the left controller 3 and the right controller 4, whether or not an operation is performed in the state where the left controller 3 and the right controller 4 are attached to the gun-shaped attachment.

Further, in the above description, an example has been used where the main body apparatus 2 performs the operation method determination process. Alternatively, the left controller 3 and/or the right controller 4 may perform at least part of the operation method determination process. For example, the process of calculating the orientation of the left controller 3, the process of calculating the axial directions or the amounts of change in the axial directions of the left controller 3, the process of calculating an acceleration (a gravitational acceleration) generated in the left controller 3, and the like may be performed in the left controller 3. Alternatively, the process of calculating the orientation of the right controller 4, the process of calculating the axial directions or the amounts of change in the axial directions of the right controller 4, the process of calculating an acceleration (a gravitational acceleration) generated in the right controller 4, and the like may be performed in the right controller 4. As an example, when, in each of the left controller 3 and the right controller 4, the process of calculating the orientation of the controller is performed, the process is performed in a processing section provided in the controller. Based on acceleration data detected by the acceleration sensor provided in the controller, the processing section calculates the direction of the gravitational acceleration generated in the controller and calculates the directions of the xyz axes of the controller with respect to the direction of the gravitational acceleration. Then, the processing section changes the xyz-axis directions with respect to the direction of the gravitational acceleration using angular velocities about the axes detected by the angular velocity sensor provided in the controller, thereby sequentially calculating the orientation of the controller. Then, the processing section transmits data indicating the orientation to the main body apparatus 2. Consequently, the main body apparatus 2 acquires the orientations of the left controller 3 and the right controller 4 and performs the processing after the orientation calculation, and thereby can perform the above operation method determination process.

Further, in the above exemplary embodiment, examples have been used where a single user performs game play using the left controller 3 and the right controller 4 by the two-hand-held operation method or the extension grip operation method. Alternatively, it is also possible that a plurality of users perform game play. In this case, regarding a set of the left controller 3 and the right controller 4 used by each of the users, an operation method may be determined, and game processing corresponding to the operation method may be performed.

Further, in the above exemplary embodiment, an example has been used where it is determined whether an operation is performed in the state where the left controller 3 and the right controller 4 are attached to the extension grip 350, which is an example of the attachment (in the extension grip operation method), or an operation is performed in the state where the left controller 3 and the right controller 4 are detached from the main body apparatus 2 and the extension grip 350 (in the two-hand-held operation method). Alternatively, the presence or absence of attachment to an apparatus different from the attachment may be determined. For example, based on the motions or the orientations of the left controller 3 and the right controller 4, it may be determined whether an operation is performed in the state where the left controller 3 and the right controller 4 are attached to an information processing apparatus (the main body apparatus 2 in the exemplary embodiment) for performing the above game processing or making the above determination of the operation method, or an operation is performed in the state where the left controller 3 and the right controller 4 are detached from the information processing apparatus. In the above exemplary embodiment, when the left controller 3 and the right controller 4 are attached to the main body apparatus 2, the left controller 3 and the right controller 4 are electrically connected to the main body apparatus 2 and become able to perform wired communication with each other. Based on whether or not the wired communication can be performed, the presence or absence of attachment to the main body apparatus 2 can be determined. However, the following cases are possible. That is, even when the left controller 3 and the right controller 4 are attached to the information processing apparatus, but when the left controller 3 and the right controller 4 are not electrically connected to the information processing apparatus, and these apparatuses do not have the functions of performing wired communication with each other. Further, the left controller 3 and the right controller 4 always perform wireless communication with the information processing apparatus, regardless of whether or not the left controller 3 and the right controller 4 are attached to the information processing apparatus. Even in such forms, based on the motions or the orientations of the left controller 3 and the right controller 4, and using the operation method determination process, the information processing apparatus can determine whether an operation is performed in the state where the left controller 3 and the right controller 4 are attached to the information processing apparatus, or an operation is performed in the state where the left controller 3 and the right controller 4 are detached from the information processing apparatus. Thus, it is possible to similarly determine the operation method.

Further, in the above exemplary embodiment, an example has been used where it is determined whether or not a plurality of controllers (the left controller 3 and the right controller 4) are attached to the attachment (the extension grip 350). Alternatively, it may be determined whether or not one of the controllers is attached to the attachment. As an example, even when it is determined whether or not the left controller 3 is attached to the extension grip 350 to which the right controller 4 is already attached or fixed, the main body apparatus 2 receives the detection results (e.g., acceleration data and/or angular velocity data) of the motion/orientation sensors transmitted from the left controller 3 and the right controller 4, whereby the main body apparatus 2 can determine whether or not the left controller 3 is attached to the extension grip 350. In this case, after the determination of attachment of the left controller 3 is made, operation data transmitted from the right controller 3 may not be used. As another example, a case is possible where it is determined whether or not the left controller 3 is attached to the extension grip 350 in which a sensor similar to the motion/orientation sensor included in the right controller 4 (e.g., the acceleration sensor 114 and/or the angular velocity sensor 115) is provided. In this case, the left controller 3 and the extension grip 350 transmit the detection results of the motion/orientation sensors (e.g., acceleration data and/or angular velocity data) to the main body apparatus 2, whereby the main body apparatus 2 receiving the detection results can determine whether or not the left controller 3 is attached to the extension grip 350.

Further, in the above exemplary embodiment, the method for detecting the motions and the orientations of the left controller 3 and the right controller 4 is merely illustrative, and the motions and the orientations of the left controller 3 and the right controller 4 may be detected using another method or other data. Further, in the above exemplary embodiment, a game image corresponding to an operation using the left controller 3 or the right controller 4 is displayed on the stationary monitor 6. Alternatively, the game image may be displayed on the display 12 of the main body apparatus 2. Further, a controller for controlling the actions of the first object G1 and/or the second object G2 may not only be a set of the left controller 3 and the right controller 4, but also be obtained by combining another controller with the left controller 3 or the right controller 4, or combining other controllers together.

Further, in another exemplary embodiment, the main body apparatus 2 may be able to directly communicate with the stationary monitor 6. For example, the main body apparatus 2 and the stationary monitor 6 may be able to directly perform wired communication with each other, or directly perform wireless communication with each other. In this case, based on whether or not the main body apparatus 2 and the stationary monitor 6 can directly communicate with each other, the main body apparatus 2 may determine the display destination of an image.

Further, an additional apparatus (e.g., a cradle) may be any additional apparatus attachable to and detachable from the main body apparatus 2. The additional apparatus may or may not have the function of charging the main body apparatus 2 as in the exemplary embodiment.

Further, the game system 1 may be any apparatus, and may be a mobile game apparatus, any mobile electronic device (a PDA (Personal Digital Assistant), a mobile phone, a personal computer, a camera, a tablet, or the like) or the like.

Further, the above descriptions have been given using an example where the game system 1 performs information processing (game processing) and a communication process. Alternatively, another apparatus may perform at least some of the processing steps. For example, if the game system 1 is further configured to communicate with another apparatus (e.g., another server, another image display device, another game apparatus, or another mobile terminal), the other apparatus may cooperate to perform the processing steps. Another apparatus may thus perform at least some of the processing steps, thereby enabling processing similar to that described above. Further, the above information processing (game processing) can be performed by a processor or the cooperation of a plurality of processors, the processor or the plurality of processors included in an information processing system including at least one information processing apparatus. Further, in the above exemplary embodiment, information processing can be performed by the CPU 81 of the game system 1 executing a predetermined program. Alternatively, part or all of the processing of the flow charts may be performed by a dedicated circuit included in the game system 1.

Here, according to the above variations, it is possible to achieve the exemplary embodiment also by a system form such as cloud computing, or a system form such as a distributed wide area network or a local area network. For example, in a system form such as a distributed local area network, it is possible to execute the processing between a stationary information processing apparatus (a stationary game apparatus) and a mobile information processing apparatus (a mobile game apparatus) by the cooperation of the apparatuses. It should be noted that, in these system forms, there is no particular limitation on which apparatus performs the above processing. Thus, it goes without saying that it is possible to achieve the exemplary embodiment by sharing the processing in any manner.

Further, the processing orders, the setting values, the conditions used in the determinations, and the like that are used in the information processing described above are merely illustrative. Thus, it goes without saying that the exemplary embodiment can be achieved also with other orders, other values, and other conditions.

Further, the above program may be supplied to the game system 1 not only through an external storage medium such as an external memory, but also through a wired or wireless communication link. Further, the program may be stored in advance in a non-volatile storage device included in the apparatus. It should be noted that examples of an information storage medium having stored therein the program may include CD-ROMs, DVDs, optical disk storage media similar to these, flexible disks, hard disks, magneto-optical disks, and magnetic tapes, as well as non-volatile memories. Alternatively, an information storage medium having stored therein the program may be a volatile memory for storing the program. It can be said that such a storage medium is a storage medium readable by a computer or the like. For example, it is possible to provide the various functions described above by causing a computer or the like to load a program from the storage medium and execute it.

While some exemplary systems, exemplary methods, exemplary devices, and exemplary apparatuses have been described in detail above, the above descriptions are merely illustrative in all respects, and do not limit the scope of the systems, the methods, the devices, and the apparatuses. It goes without saying that the systems, the methods, the devices, and the apparatuses can be improved and modified in various manners without departing the spirit and scope of the appended claims. It is understood that the scope of the systems, the methods, the devices, and the apparatuses should be interpreted only by the scope of the appended claims. Further, it is understood that the specific descriptions of the exemplary embodiment enable a person skilled in the art to carry out an equivalent scope on the basis of the descriptions of the exemplary embodiment and general technical knowledge. When used in the specification, the components and the like described in the singular with the word "a" or "an" preceding them do not exclude the plurals of the components. Furthermore, it should be understood that, unless otherwise stated, the terms used in the specification are used in their common meanings in the field. Thus, unless otherwise defined, all the jargons and the technical terms used in the specification have the same meanings as those generally understood by a person skilled in the art in the field of the exemplary embodiment. If there is a conflict, the specification (including definitions) takes precedence.

As described above, the exemplary embodiment can be used as a game system, a game apparatus, a game program, a game processing method, and the like that are capable of, based on at least one of the motion and the orientation of a game controller, determining, for example, whether the game controller is operated in the state where the game controller is attached to an attachment, or the game controller is operated in the state where the game controller is not attached to the attachment.

What is claimed is:

1. A game system including a first game controller, a second game controller, an attachment to which the first game controller and the second game controller are physically couplable, and a game apparatus configured to communicate with the first game controller and the second game controller, the game apparatus and the attachment being separate and remote from, and unconnected to, one another,
   the first game controller comprising:
      a first motion/orientation sensor configured to output first data corresponding to at least one of a motion and an orientation of the first game controller; and
      a first transceiver configured to transmit, to the game apparatus, the first data output from the first motion/orientation sensor,
   the second game controller comprising:
      a second motion/orientation sensor configured to output second data corresponding to at least one of a motion and an orientation of the second game controller; and
      a second transceiver configured to transmit, to the game apparatus, the second data output from the second motion/orientation sensor,
   the game apparatus comprising a computer configured to:
      receive the first data and the second data;
      based on the first data and the second data, determine which one of plural modes the first and second game controllers are being used in, a first mode corresponding to the first and second game controllers being physically coupled to the attachment and being structured to operate as a single unitary game controller made integrally, and a second mode corresponding to the first and second game controllers being physically decoupled from the attachment and the game apparatus as well as each other and being structured to operate as a single game controller divided into first and second unconnected parts corresponding to the first and second game controllers; and perform game processing using inputs from the first and second game controllers according to the mode that the first and second game controllers are determined to be used in.

2. The game system according to claim 1, wherein:
the first motion/orientation sensor is an angular velocity sensor configured to detect an angular velocity generated in the first game controller, and
the second motion/orientation sensor is an angular velocity sensor configured to detect an angular velocity generated in the second game controller.

3. The game system according to claim 2, wherein:
in the determination, the computer is further configured to:
based on an angular velocity corresponding to the first data, calculate a first orientation of the first game controller; and
based on an angular velocity corresponding to the second data, calculate a second orientation of the second game controller, and
the determination of the mode that the first and second game controllers are being used in is based on the first orientation and the second orientation.

4. The game system according to claim 3, wherein when a difference between the first orientation and the second orientation is within a predetermined range, the first and second game controllers are determined to be operating in the first mode.

5. The game system according to claim 4, when a difference between the first orientation and the second orientation is within the predetermined range for a predetermined time, the first and second game controllers are determined to be operating in the first mode.

6. The game system according to claim 3, wherein:
in the determination, the computer is further configured to:
in accordance with an angular velocity based on the first data, calculate a first parameter indicating at least one of the motion and the orientation of the first game controller that is different from the first orientation; and
in accordance with an angular velocity based on the second data, calculate a second parameter indicating at least one of the motion and the orientation of the second game controller that is different from the second orientation, and
the determination of the mode that the first and second game controllers are being used in is based on the first orientation, the second orientation, the first parameter, and the second parameter.

7. The game system according to claim 1, wherein:
the first game controller further comprises a third motion/orientation sensor configured to output third data corresponding to at least one of the motion and the orientation of the first game controller, the third motion/orientation sensor being different from the first motion/orientation sensor,
the first transceiver is further configured to transmit, to the game apparatus, the third data output from the third motion/orientation sensor,
the second game controller further comprises a fourth motion/orientation sensor configured to output fourth data corresponding to at least one of the motion and the orientation of the second game controller, the fourth motion/orientation sensor being different from the second motion/orientation sensor, the second transceiver is further configured to transmit, to the game apparatus, the fourth data output from the fourth motion/orientation sensor,
the third data and the fourth data are further received by the computer of the game apparatus, and
the determination of the mode that the first and second game controllers are being used in is based on the first, second, third, and fourth data.

8. The game system according to claim 7, wherein:
the first motion/orientation sensor is an angular velocity sensor configured to detect an angular velocity generated in the first game controller,
the second motion/orientation sensor is an angular velocity sensor configured to detect an angular velocity generated in the second game controller,
the third motion/orientation sensor is an acceleration sensor configured to detect an acceleration generated in the first game controller, and
the fourth motion/orientation sensor is an acceleration sensor configured to detect an acceleration generated in the second game controller.

9. The game system according to claim 7, wherein when at least either of the at least one of the motion and the orientation of the first game controller indicated by the third data and the at least one of the motion and the orientation of the second game controller indicated by the fourth data satisfies a predetermined condition, a result of a determination as to the mode that the first and second game controllers are being used in before the condition is satisfied is maintained.

10. The game system according to claim 1, wherein when a difference between a value of the first data and a value of the second data is within a predetermined range, the first and second game controllers are determined to be operating in the first mode.

11. The game system according to claim 10, wherein when the difference between the value of the first data and the value of the second data is within the predetermined range for a predetermined time, the first and second game controllers are determined to be operating in the first mode.

12. The game system according to claim 1, wherein, at least during the performance of the game processing, a determination process for determining which mode the first and second game controllers are being used in is repeatedly performed.

13. The game system according to claim 12, wherein when a condition for determining that the motion or the orientation of at least one of the first game controller and the second game controller is the motion or the orientation of the controller(s) used in the second mode is satisfied in a state where the game processing is performed in the second mode, the result of the determination that the first game controller and the second game controller are being used in the second mode is maintained.

14. The game system according to claim 1, wherein the determination as to which mode the first and second game controllers are being used in is performed during the game processing.

15. The game system according to claim 14, wherein:
when the determination is made that the first and second game controllers are being used in the second mode, the game processing is performed in accordance with a first operation performed on the first game controller and/or the second game controller, and
when the determination is made that the first and second game controllers are being used in the first mode, the game processing is performed in accordance with a second operation different from the first operation performed on the first game controller and/or the second game controller.

16. The game system according to claim 14, wherein:
when the determination is made that the first and second game controllers are being used in the second mode, the game processing is performed in accordance with a third operation performed on the first game controller and/or the second game controller, and
when the determination is made that the first and second game controllers are being used in the first mode, the game processing is performed differently from the game processing that is performed in accordance with the third operation performed on the first game controller and/or the second game controller.

17. The game system according to claim 1, wherein
the first transceiver is configured to transmit first operation data corresponding to an operation performed on the first game controller, together with the first data to the game apparatus,
the second transceiver is configured to transmit second operation data corresponding to an operation performed on the second game controller, together with the second data to the game apparatus,
the first data, the second data, the first operation data, and the second operation data are received by the computer of the game apparatus, and
the game processing is performed based on the result of the determination and the first operation data and the second operation data.

18. The game system according to claim 1, wherein
in the determination, the computer is further configured to:
based on the first data, calculate the motion of the first game controller; and
based on the second data, calculate the motion of the second game controller, and
a determination that the first and second game controllers are being used in the first mode when the motion of the first game controller and the motion of the second game controller are the same as each other.

19. The game system according to claim 18, wherein:
the first motion/orientation sensor is an angular velocity sensor configured to detect an angular velocity generated in the first game controller,
the second motion/orientation sensor is an angular velocity sensor configured to detect an angular velocity generated in the second game controller,
in the calculation of the motion of the first game controller, the angular velocity generated in the first game controller is calculated as the motion of the first game controller, and
in the calculation of the motion of the second game controller, the angular velocity generated in the second game controller is calculated as the motion of the second game controller.

20. A game apparatus configured to communicate with a first game controller and a second game controller that are physically couplable to an attachment, the game apparatus and the attachment being separate and remote from, and unconnected to, one another, the game apparatus comprising a computer configured to at least:
receive from a first motion/orientation sensor of the first game controller via a first transceiver of the first game controller first data based on at least one of a motion and an orientation of the first game controller, and
receive from a second motion/orientation sensor of the second game controller via a second transceiver of the second game controller second data based on at least one of a motion and an orientation of the second game controller;
based on the first data and the second data, determine which one of plural modes the first and second game controllers are being used in, a first mode corresponding to the first and second game controllers being physically coupled to the attachment and being structured to operate as a single unitary game controller made integrally, and a second mode corresponding to the first and second game controllers being physically decoupled from the attachment and the game apparatus as well as each other and being structured to operate as a single game controller divided into first and second unconnected parts corresponding to the first and second game controllers; and
perform game processing using inputs from the first and second game controllers according to the mode that the first and second game controllers are determined to be used in.

21. A non-transitory computer-readable storage medium having stored therein a game program executed by a computer included in a game apparatus configured to communicate with a first game controller and a second game controller that are physically couplable to an attachment, the game apparatus and the attachment being separate and remote from, and unconnected to, one another, the game program, when executed, causing the computer to at least:
receive from a first motion/orientation sensor of the first game controller via a first transceiver of the first game controller first data based on at least one of a motion and an orientation of the first game controller, and
receive from a second motion/orientation sensor of the second game controller via a second transceiver of the second game controller second data based on at least one of a motion and an orientation of the second game controller;
based on the first data and the second data, determine which one of plural modes the first and second game controllers are being used in, a first mode corresponding to the first and second game controllers being physically coupled to the attachment and being structured to operate as a single unitary game controller made integrally, and a second mode corresponding to the first and second game controllers being physically decoupled from the attachment and the game apparatus as well as each other and being structured to operate as a single game controller divided into first and second unconnected parts corresponding to the first and second game controllers; and
perform game processing using inputs from the first and second game controllers according to the mode that the first and second game controllers are determined to be used in.

22. A game processing method for use with a game apparatus, a first game controller, a second game controller, and an attachment to which the first game controller and the second game controller are physically couplable, the game apparatus and the attachment being separate and remote from, and unconnected to, one another, the method comprising:
receiving from a first motion/orientation sensor of the first game controller via a first transceiver of the first game controller first data based on at least one of a motion and an orientation of the first game controller, and receiving from a second motion/orientation sensor of the second game controller via a second transceiver of the second game controller second data based on at least one of a motion and an orientation of the second game controller;

based on the first data and the second data, determining which one of plural modes the first and second game controllers are being used in, a first mode corresponding to the first and second game controllers being physically coupled to the attachment and being structured to operate as a single unitary game controller made integrally, and a second mode corresponding to the first and second game controllers being physically decoupled from the attachment and the game apparatus as well as each other and being structured to operate as a single game controller divided into first and second unconnected parts corresponding to the first and second game controllers; and controlling the game processing based on inputs from the first and second game controllers according to the mode that the first and second game controllers are determined to be used in.

* * * * *